United States Patent
Badawy et al.

(10) Patent No.: US 10,848,499 B2
(45) Date of Patent: *Nov. 24, 2020

(54) SYSTEM AND METHOD FOR ROLE MINING IN IDENTITY MANAGEMENT ARTIFICIAL INTELLIGENCE SYSTEMS USING CLUSTER BASED ANALYSIS OF NETWORK IDENTITY GRAPHS

(71) Applicant: SailPoint Technologies, Inc., Wilmington, DE (US)

(72) Inventors: Mohamed M. Badawy, Round Rock, TX (US); Jostine Fei Ho, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,435

(22) Filed: Dec. 13, 2019

(65) Prior Publication Data

US 2020/0280564 A1 Sep. 3, 2020

Related U.S. Application Data

(63) Continuation of application No. 16/288,850, filed on Feb. 28, 2019, now Pat. No. 10,554,665.

(51) Int. Cl.
*G06F 21/00* (2013.01)
*H04L 29/06* (2006.01)
*G06F 16/901* (2019.01)

(52) U.S. Cl.
CPC ........ *H04L 63/102* (2013.01); *G06F 16/9024* (2019.01); *H04L 63/0892* (2013.01); *H04L 63/104* (2013.01); *H04L 63/20* (2013.01)

(58) Field of Classification Search
CPC .. H04L 63/102; H04L 63/104; G06F 16/9024
USPC .......................................................... 726/6
See application file for complete search history.

(56) References Cited

U.S. PATENT DOCUMENTS

| | | | |
|---|---|---|---|
| 7,526,785 B1 | 4/2009 | Pearson et al. |
| 7,725,416 B2 | 5/2010 | Buss |
| 8,065,712 B1 | 11/2011 | Cheng |
| 8,209,742 B2 | 6/2012 | Schreiber et al. |
| 8,656,161 B2 | 2/2014 | Nakae |
| 8,683,546 B2 | 3/2014 | Dunagan |

(Continued)

OTHER PUBLICATIONS

International Search Report and Written Opinion for International Patent Application No. PCT/US2019/062743, dated Jan. 13, 2020, 6 pgs.

(Continued)

*Primary Examiner* — Longbit Chai
(74) *Attorney, Agent, or Firm* — Sprinkle IP Law Group

(57) ABSTRACT

Systems and methods for embodiments of a graph based artificial intelligence systems for identity management are disclosed. Embodiments of the identity management systems disclosed herein may utilize a network graph approach to analyzing identities or entitlements of a distributed networked enterprise computing environment. Specifically, in certain embodiments, an artificial intelligence based identity management systems may utilize the peer grouping of an identity graph (or peer grouping of portions or subgraphs thereof) to identify roles from peer groups or the like.

21 Claims, 18 Drawing Sheets

(56) References Cited

U.S. PATENT DOCUMENTS

| | | | |
|---|---|---|---|
| 9,077,728 | B1 | 7/2015 | Hart |
| 9,246,945 | B2 | 1/2016 | Chari et al. |
| 9,286,595 | B2 | 3/2016 | Taneja |
| 9,288,232 | B2 | 3/2016 | Chari et al. |
| 9,516,053 | B1 | 12/2016 | Muddu |
| 9,679,125 | B2 * | 6/2017 | Bailor .................. G06F 21/316 |
| 9,699,196 | B1 | 7/2017 | Kolman |
| 9,787,688 | B2 | 10/2017 | Japtap |
| 9,819,685 | B1 | 11/2017 | Scott |
| 9,992,230 | B1 | 6/2018 | Haverty |
| 10,298,589 | B2 | 5/2019 | Cleaver |
| 10,341,430 | B1 | 7/2019 | Badawy et al. |
| 10,348,735 | B2 | 7/2019 | Anderson |
| 10,476,952 | B1 | 11/2019 | Badawy |
| 10,476,953 | B1 * | 11/2019 | Badawy ............ H04L 29/06904 |
| 10,523,682 | B1 | 12/2019 | Badawy |
| 10,554,665 | B1 | 2/2020 | Badawy |
| 10,621,368 | B2 | 4/2020 | Ravizza |
| 10,681,056 | B1 | 6/2020 | Badawy |
| 2002/0026592 | A1 | 2/2002 | Gavrila et al. |
| 2007/0067845 | A1 | 3/2007 | Wiemer |
| 2007/0226248 | A1 | 9/2007 | Darr |
| 2008/0091681 | A1 | 4/2008 | Dwivedi et al. |
| 2008/0147584 | A1 | 6/2008 | Buss |
| 2008/0288330 | A1 | 11/2008 | Hildebrand |
| 2009/0222894 | A1 | 9/2009 | Kenny et al. |
| 2009/0300711 | A1 | 12/2009 | Tokutani et al. |
| 2010/0082695 | A1 | 4/2010 | Hardt |
| 2010/0274815 | A1 | 10/2010 | Vanasco |
| 2011/0209196 | A1 | 8/2011 | Kennedy |
| 2012/0023576 | A1 | 1/2012 | Sorensen et al. |
| 2012/0216243 | A1 | 8/2012 | Gill et al. |
| 2012/0246098 | A1 | 9/2012 | Chari et al. |
| 2013/0232539 | A1 | 9/2013 | Polunin |
| 2013/0254833 | A1 | 9/2013 | Nicodemus et al. |
| 2013/0283339 | A1 | 10/2013 | Biswas et al. |
| 2014/0207813 | A1 | 7/2014 | Long |
| 2015/0128211 | A1 | 5/2015 | Kirner |
| 2015/0379429 | A1 | 12/2015 | Lee |
| 2016/0203327 | A1 | 7/2016 | Akkiraju |
| 2016/0294645 | A1 | 10/2016 | Kirner |
| 2016/0294646 | A1 | 10/2016 | Kirner |
| 2017/0103164 | A1 | 4/2017 | Dunlevy |
| 2017/0103165 | A1 | 4/2017 | Dunlevy |
| 2017/0147790 | A1 | 5/2017 | Patel |
| 2017/0220964 | A1 | 8/2017 | Datta Ray |
| 2017/0310552 | A1 | 10/2017 | Wallerstein |
| 2017/0329957 | A1 | 11/2017 | Vepa |
| 2017/0364534 | A1 | 12/2017 | Zhang |
| 2018/0069899 | A1 | 3/2018 | Lang |
| 2019/0114342 | A1 * | 4/2019 | Orun ..................... G06F 16/215 |
| 2020/0007555 | A1 | 1/2020 | Jadhav |
| 2020/0169603 | A1 | 5/2020 | Badawy |
| 2020/0259840 | A1 | 8/2020 | Badawy |

OTHER PUBLICATIONS

Notice of Allowance for U.S. Appl. No. 16/691,998, dated Apr. 20, 2020, 2 pgs.

Notice of Allowance for U.S. Appl. No. 16/691,998, dated Jan. 30, 2020, 9 pgs.

Saltzer, Jerome H. et al., "The Protection of Information in Computer Systems," Proceedings of the IEEE, 63(9), Sep. 1975, pp. 1278-1308.

Bishop, Matt et al., "We have Met the Enemy and He is Us," NSPW '08: Proceedings of the 2008 workshop on New Security paradigms, Sep. 2008, 11 pgs.

Frank, Mario et al., "A probabilistic approach to hybrid role mining," CCS '09, Nov. 2009, 11 pgs.

Molloy, Ian et al., "Generative Models for Access Control Policies: Applications to Role Mining Over Logs with Attribution," Proceedings of the 17th ACM Symposium on Access Control Models and Technologies, SACMAT, Jun. 2012, 11 pgs.

Blei, David M. et al., "Latent Dirichlet Allocation," Journal of Machine Learning Research 3, Jan. 2003, pp. 993-1022.

McDaniel, Patrick et al., "Securing Distributed Applications Using a Policy-based Approach," Ann Arbor, Dec. 19, 2003, 48109-2122, 24 pgs.

Chen, Ying et al., "Data Mining and Service Rating in Service-Oriented Architectures to Improve Information Sharing," 2005 IEEE Aerospace Conference, (Version 7, Updated Jan. 27, 2005) Mar. 2005, 11 pgs.

Molloy, Ian, "Automatic Migration to Role-Based Access Control," CERIAS Tech Report 2010-34, Purdue University, IN, Thesis Dissertation/Acceptance, Aug. 2010, 178 pgs.

Ene, Alina et al., "Fast Exact and Heuristic Methods for Role Minimization Problems," SACMAT '08 Proceedings of the 13th ACM symposium on Access control models and technologies, Estes, CO, Jun. 11-13, 2008, pp. 1-10.

Harrison, Michael A. et al., "Protection in Operating Systems," Communications of the ACM, vol. 19, No. 8, Aug. 1976, pp. 461-471.

Li, Ninghui et al., "Access Control Policy Combining: Theory Meets Practice," Proceedings of the 14th ACM symposium on Access control models and technologies SACMAT '09, Jun. 3-5, 2009, 10 pgs.

Schneider, Fred B., "Least Privilege and More," IEEE Security & Privacy, vol. 1, Issue 5, Sep. 2003, pp. 209-213.

Office Action for U.S. Appl. No. 13/970,174, dated Nov. 4, 2014, 22 pgs.

Office Action for U.S. Appl. No. 13/904,350, dated Nov. 14, 2014, 33 pgs.

Office Action for U.S. Appl. No. 13/904,350, dated Apr. 27, 2015, 28 pgs.

Office Action for U.S. Appl. No. 13/970,174, dated Jun. 24, 2015, 16 pgs.

Xu, Wei et al., Taint-Enhanced Policy Enforcement: A Practical Approach to Defeat a Wide Range of Attacks, 15th USENIX Security Symposium, 2006, pp. 121-136.

Notice of Allowance for U.S. Appl. No. 16/288,850, dated Aug. 1, 2019, 7 pgs.

Notice of Allowance for U.S. Appl. No. 16/288,850, dated Nov. 21, 2019, 5 pgs.

Notice of Allowance for U.S. Appl. No. 16/582,493, dated Jun. 24, 2020, 4 pgs.

Notice of Allowance for U.S. Appl. No. 16/900,530, dated Aug. 12, 2020, 12 pgs.

* cited by examiner

SYSTEM AND METHOD FOR ROLE MINING IN IDENTITY MANAGEMENT ARTIFICIAL INTELLIGENCE SYSTEMS USING CLUSTER BASED ANALYSIS OF NETWORK IDENTITY GRAPHS

RELATED APPLICATIONS

This application is a continuation of, and claims a benefit of priority under 35 U.S.C. 120 of the filing date of U.S. patent application Ser. No. 16/288,850 filed Feb. 28, 2019, entitled "SYSTEM AND METHOD FOR ROLE MINING IN IDENTITY MANAGEMENT ARTIFICIAL INTELLIGENCE SYSTEMS USING CLUSTER BASED ANALYSIS OF NETWORK IDENTITY GRAPHS", which is fully incorporated herein by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to computer security. In particular, this disclosure relates to the application of artificial intelligence to identity management in a distributed and networked computing environment. Even more specifically, this disclosure relates to enhancing computer security in a distributed networked computing environment through the use of role mining in these artificial intelligence based identity management systems, including the use of graph based identity or entitlement peer grouping and analysis in association with such role mining.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of identity management, then, is to help users identify and mitigate risks associated with access management. Many times this access risk may result as an outgrowth of the evolution of roles within an enterprise over time. As roles have entitlements added or deleted and as different roles are assigned or removed from different identities these changes may create a complex system that evolves in unpredictable ways over time. As the roles and identities evolve, they may stray in substantial and detrimental ways from the 'gold standard' of the role definition or other identity governance desires of the enterprise.

Accordingly, it is desirable for identity management solutions to offer tools to assist in the mining and assessment of roles associated with the identity management data associated with enterprise.

SUMMARY

As mentioned, it is desirable for identity management solutions to offer role mining capability or other role assessment capabilities whereby collections of entitlements may be ascertained from the identity management data associated with enterprise. For these identity management solutions, two major types of roles can be identified, enterprise roles, which may be thought of as collections of entitlements or access profiles that are assigned to identities based on specific rules of the enterprise in terms of the identity's attributes, their expected responsibilities within the organization, or other criteria. This approach is typically referred to as a top-down approach. In other words, these enterprise roles may define an ideal or 'golden' state of the roles of an enterprise as defined by that enterprise. As discussed, inaccuracies can and will always occur in these top-down definitional approach to roles due to several factors, e.g. evolution of responsibilities, variance of scope of the day-to-day duties even between similarly ranked identities.

As a result, certain role mining solutions may employ the use of information technology roles, which can be defined as collections or patterns of access entitlements that can be determined based on commonality of these patterns within particular groupings or business units (e.g., departments or locations) within an enterprise. In contrast with the top-down approach, this approach truthfully reflects the current state of access entitlements as an evolving system, and it avoids any ad-hoc business rules that may have lapsed, and as a result, no longer accurately describe the current state of the evolving entitlement system. This approach is typically referred to as a bottom-up approach.

What is desired, therefore, are identity management systems that allow an accurate bottom-up approach to role mining for identity governance. This will allow the identification of new roles and the evolution or creation of new enterprise roles to accommodate these new discovered roles. Ultimately, this will yield an improved model for roles that will accurately match the evolving access entitlement system. Moreover, by accurately identifying the common patterns of access entitlements, an identity management system may be provided the capability to model the hierarchical structure of access entitlements and identify deprecated entitlements or outlier entitlements that may not be part of any mined roles.

Accordingly, to ameliorate or address these issues, among other ends, embodiments of the identity management systems disclosed herein may utilize a network graph approach to improve identity governance, including the mining of roles from the identity management data associated with an enterprise. Specifically, embodiments of identity management systems as disclosed may provide bottom-up role mining based on network graph of the identities or entitlement of an enterprise. In particular, embodiments as disclosed may utilize the peer grouping of an identity graph (or peer grouping of portions or subgraphs thereof) to identify roles from peer groups or the like (e.g., peer groups or other densely connected components or clusters such as cliques or pseudo-cliques).

In one embodiment, identity management data can be obtained from one or more identity management systems in a distributed enterprise computing environment, the identity management data comprising data on a set of identities and a set of entitlements associated with the set of identities utilized in identity management in the distributed enterprise computing environment. The identity management data is evaluated to determine the set of identities and a set of entitlements associated with the set of identities. An identity graph is generated from the identity management data and stored.

The set of identities represented by the nodes of the identity graph are clustered into a set of identity peer groups or the set of entitlements represented by the nodes of the identity graph are clustered into a set of entitlement peer groups, wherein the clustering is based on the nodes and edged of the identity graph. When a role mining request is received at the identity management system a role can be determined from an identity peer group of the set of identity peer groups or from an entitlement peer group of the set of entitlement peer groups, where the role comprises a set of entitlements determined from the identity peer group or the entitlement peer group. This role is then returned to the user of the identity management system through the interface.

In a particular embodiment, the role mining request includes a scoping attribute and a subgraph of the identity graph is determined based on the scoping attribute, wherein the identity peer group or the entitlement peer group that may be used for the determination of a role is associated with the determined subgraph Embodiments provide numerous advantages over previously available systems and methods for measuring access risk. As embodiments are based on a graph representation of identity management data, the graph structure may serve as a physical model of the data, allowing more intuitive access to the data (e.g., via graph database querying, or via graph visualization techniques). This ability may yield deeper and more relevant insights for users of identity management systems. Such abilities are also an outgrowth of the accuracy of the results produced by embodiments as disclosed.

Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments of property graphs (also referred to as identity graphs) and clustering approaches by reducing the computation time and processor cycles required (e.g., and thus improving processing speed) and simultaneously reducing memory usage or other memory requirements.

Similarly, a network graph approach to peer grouping will expose and utilize the strong homophily aspects inherent in this use case. By capturing the homophilic nature of identity governance, the opportunity arises for a large number of applications of the peer groups an identity graphs, including, automation of access approval and certification campaigns.

As yet another advantage, embodiments may be dynamic with respect to time, allowing the development update processes using deltas between snapshots of data collection, bringing down operational costs and improving the performance and robustness of embodiments.

Moreover, the graph format used by certain embodiments, allows the translation of domain and enterprise specific concepts, phenomena, and issues into tangible, quantifiable, and verifiable hypotheses which may be examined or validated with graph-based algorithms. Accordingly, embodiments may be especially useful in assessing risk and in compliance with security policies or the like.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
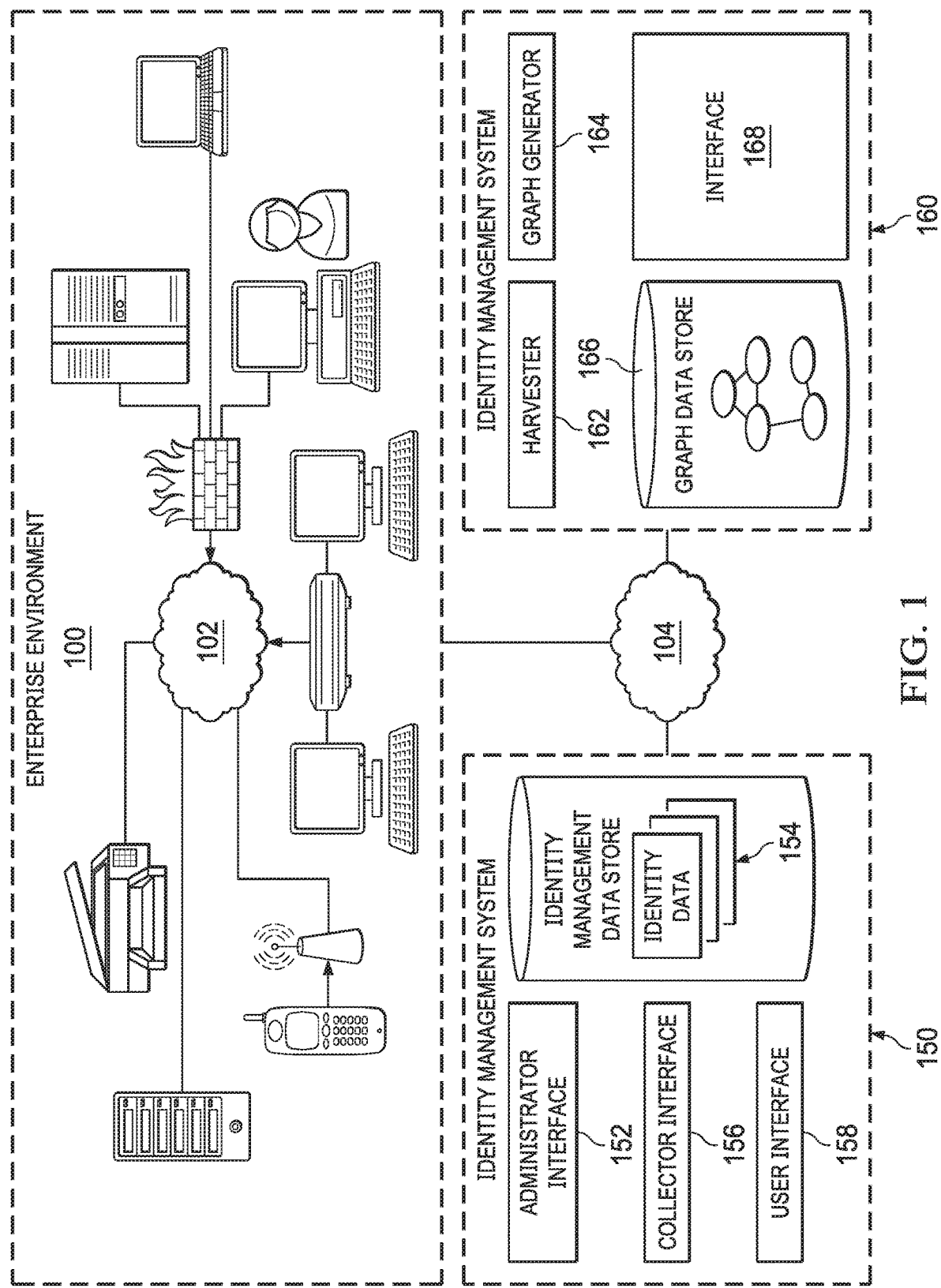
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of a function or an entity associated with an enterprise. An identity may thus represent almost physical or virtual entity, place, person or other item that an enterprise would like to define. Identities can therefore represent, for example, functions or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual entity, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

To facilitate the assignment of these entitlements, enterprises may also be provided with the ability to define roles within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity or identities to which users within the enterprise computing environment are assigned, the entitlements which a user may assigned (e.g., the functions or access which a user may be allowed) may be controlled. However, escalating security and privacy concerns are driving governance, access risk management, and compliance to the forefront of Identity Management. Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

However, to effectively meet the requirements and desires imposed upon enterprises for Identity Management, these enterprises may be required to prove that they have strong and consistent controls over who has access to critical applications and data. Accordingly, it is desirable for identity management solutions to offer role mining capability whereby collections of entitlements may be ascertained from the identity management data associated with enterprise. For these identity management solutions, two major types of roles can be identified, enterprise roles, which may be thought of as collections of entitlements or access profiles that are assigned to identities based on specific rules of the enterprise in terms of the identity's attributes, their expected responsibilities within the organization, or other criteria. This approach is typically referred to as a top-down approach. In other, words these enterprise roles may define an ideal or 'golden' state of the roles of an enterprise as defined by that enterprise. As discussed, inaccuracies can and will always occur in these top-down definitional approach to roles due to several factors, e.g. evolution of responsibilities, variance of scope of the day-to-day duties even between similarly ranked identities.

As a result, certain role mining solutions may employ the use of information technology roles, which can be defined as collections or patterns of access entitlements that can be determined based on commonality of these patterns within particular groupings or business units (e.g., departments or locations) within an enterprise. In contrast with the top-down approach, this approach truthfully reflects the current state of access entitlements as an evolving system, and it avoids any ad-hoc business rules that may have lapsed, and as a result, no longer accurately describe the current state of the evolving entitlement system. This approach is typically referred to as a bottom-up approach.

What is desired, therefore, are identity management systems that allow an accurate bottom-up approach to role mining for identity governance. This will allow the identification of new roles and the evolution or creation of new enterprise roles to accommodate these new discovered roles. Ultimately, this will yield an improved model for roles that will accurately match the evolving access entitlement system. Moreover, by accurately identifying the common patterns of access entitlements, an identity management system may be provided the capability to model the hierarchical structure of access entitlements and identify deprecated entitlements or outlier entitlements that may not be part of any mined roles.

To that end, among others, attention is now directed to the embodiments of artificial intelligence based identity governance systems that provide such role mining. Specifically, embodiments of identity governance systems as disclosed may provide bottom-up role mining based on network graph of the identities or entitlement of an enterprise. In particular, embodiments as disclosed may utilize the peer grouping of an identity graph (or peer grouping of portions or subgraphs thereof) to identify roles from peer groups or the like (e.g., peer groups or other densely connected components or dusters such as cliques or pseudo-cliques).

According to embodiments, therefore, an identity graph may be constructed. A portion of the identity graph may then be determined, where this portion may include the entire identity graph, the entire entitlement subgraph, the entire identities subgraph, a portion of the entitlement subgraph or a portion of the identities subgraph. Peer groups of identities or entitlements of the portion of the identity graph can then be determined. From these peer groups a set of roles may be determined. Specifically, a set of entitlements may be determined from a peer group (e.g., of identities or entitlements), where the determined set of entitlements may represent a determined role. These roles (e.g., an identifier for the determined role and associated entitlements) may then be stored by the identity management system for presentation to a user or other uses.

Embodiments as disclosed herein may thus provide role mining from an enterprise's actual identity management data. By determining a current snapshot of the roles mined from an actual state of the enterprise's identity governance structure, the 'golden' enterprise roles as defined by the users of the enterprise may be compared with the mined roles to reduce discrepancies therebetween, including for example, the identification of new roles, the evolution of the enterprise defined roles to match the evaluation of the actual role structure (e.g., the mined roles), or the performance housekeeping on the assignment of entitlements or roles within the enterprise to more particularly tailor the actual role structure to the ideal role structure. Additionally, by viewing the mined roles extraneous, singleton or outlier entitlements that have been deprecated or are in need of certification may be identified.

In certain cases, the efficacy of embodiments of role mining in an identity management system may depend at least partially on the state of the identities and entitlements within a distributed computing enterprise. Accordingly, before embodiments of the role mining are discussed in more detail, it may be useful to an understanding of certain embodiments if the analysis and use of entitlement and identities of an enterprise by embodiments of artificial intelligence identity governance systems are discussed in more detail, as such data may be used in the role mining itself.

With that in mind, it may be understood that good governance practice in the identity space relies on the 'social' principle that identities with strongly similar attributes should be assigned similar, if not identical, access entitlements. In the realm of identity governance and administration, this approach allows for a separation of duties and thus makes it feasible to identify, evaluate, and prioritize risks associated with privileged access. As part of a robust identity management system, it is therefore highly desirable to analyze an enterprise's data to identify potential risks. In principle, strictly enforced pre-existing governance policies should ensure that identities with strongly similar access privileges are strongly similar. It would thus be desirable to group or cluster the identities of an enterprise into peer groups such that the identities in a peer group are similar with respect to the set of entitlements assigned to the identities of that group (e.g., relative to other identities or other groups). Peer grouping of the identities within an enterprise (or viewing the peer groups of identities) may allow, for example, an auditor or other person performing a compliance analysis or evaluation to quantitatively and qualitatively assess the effectiveness of any applicable pre-existing polices, or lack thereof, and how strictly they are enforced.

However, the data utilized by most identity management systems is not strictly numerical data. Often this data includes identifications of identities (e.g., alphanumeric identifiers for an identity as maintained by an identity management system) and identifications of entitlements or roles associated with those identities (e.g., alphanumeric identifiers for entitlements or roles as maintained by the identity management system). This data may also include data identifying roles (e.g., alphanumeric identifiers or labels for a role as maintained by an identity management solution) and identifications of entitlements associated with those roles (e.g., alphanumeric identifiers for the collection of entitlements associated with those roles). Clustering of this type of categorical data (e.g., for peer grouping of identities) is typically a harder task than clustering data of numerical type. In particular, clustering categorical data is particularly challenging since intuitive, geometric-based, distance measures experienced in real life, e.g., Euclidean distance, by definition, are exclusive to numerical data. A distance measure is a crucial component of any clustering algorithm as it is utilized at the lowest level to determine how similar/dissimilar two data points are.

For example, the one-hot-encoding data transform, which can convert categorical data into numerical data, does not work in these types of cases. Due to large number of entitlements, when combining the numerical, high-dimensional, one-hot encoded data with traditional geometric distances (e.g., Euclidean), distances between data points will be quite large and will make it hard, if not impossible, for a clustering algorithm to yield meaningful outputs. This is a direct mathematical outcome to the high dimensionality of the ambient space. It is a well-documented issue in data science literature, and the applicable nomenclature is "curse of dimensionality". Typical dimensionality reduction techniques (e.g., PCA, t-SNE, etc.) have been experimented with, but due to the way these clustering algorithms manipulate numerical data, the resulting transforms may manipulate the original data in ways that are not interpretable, hence not useful in this context.

Accordingly, conventional statistical clustering such as K-modes, or K-modes used in association with a data-mining, pattern-finding algorithm such as Equivalence Class Transformation (ECLAT), have thus proven inadequate. Many of the reasons for the inadequacy of such typical clustering approaches have to do with the computationally intensive nature of the computer implementations of such clustering, which are both computationally and memory intensive, reducing or hindering the performance and responsiveness of identity management systems that utilize such clustering approaches.

Attempts to remedy these problems by altering the clustering to discard or ignore less popular identities or entitlements to enhance the signal-to-noise ratio in their application have been less than successful, achieving neither adequate results in the clusters determined or in improving the performance or memory usage of systems which employ such clustering. Other workarounds for these deficiencies have also proven unworkable to this type of identity and entitlement data.

Moreover, when attempting to cluster based on categorical data, typical clustering algorithms do not capture the social aspects of identity governance. Homophily in social networks, as defined in social sciences, is the tendency of individuals to associate and bond with similar others. In identity governance, homophily in the identity space usually results as a consequence of enforcing the governance principle that similar identities should be assigned similar access entitlements. It is thus important to attempt to capture, or otherwise utilize this homophily, when peer grouping for identity management. As a consequence of all these deficiencies, the results from prior approach to identity clustering in the context of identity management were harder to interpret, yielding fewer insights, and negatively impacting the performance, efficiency, and overall quality of identity management systems. The data-driven clustering approach of identities into peer groups remains, however, a crucial component of identity management in a distributed and networked computing environment for a variety of reasons, including the usefulness of reviewing and visualizing such clusters of identities for auditing and compliance purposes.

Accordingly, to ameliorate these issues, among other ends, embodiments of the identity management systems disclosed herein may utilize a network graph approach to peer grouping of identities and entitlements of distributed networked enterprise computing environment. Specifically, in certain embodiments, data on the identities and the respective entitlements assigned to each identity as utilized in an enterprise computer environment may be obtained by an identity management system. Using the identity and entitlement data, then, a network identity graph may be constructed, where the nodes of the graph correspond to, and represent, each of the identities or entitlements. Each edge (or relationship) of the graph may join two nodes of the graph and be associated with a similarity weight representing a degree of similarity between the identities or entitlements of the respective nodes. The identity graph may then be pruned to remove weak edges (e.g., those edges whose similarity weight may fall below a pruning threshold). The pruned identity graph can then be clustered into peer groups of identities or entitlement groups (e.g., using a graph based community detection algorithm). These peer groups of identities (or entitlements) can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities or entitlements may be optimized based on a peer group assessment metric, such as, for example, graph modularity determined based on the identity graph or the determined peer groups. For instance, in one embodiment, if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities or entitlements and a peer group assessment metric determined based on the newly pruned identity graph or the newly determined peer groups. If this new peer assessment metric is now above (or below) the quality threshold the feedback loop may stop and these peer groups of identities or entitlements can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the identity graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups of identities or entitlements resulting from the clustering) may more accurately reflect particular requirements or the needs of a particular enterprise or be better tailored to a particular use.

Embodiments may thus provide a number of advantages including allowing more intuitive access to the data (e.g., via graph database querying, or via graph visualization techniques), which may, in turn, yield deeper and more relevant insights for users of identity management systems. Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments. Likewise, embodiments may be dynamic with respect to time, allowing the development update processes using deltas between snapshots of data collection, bringing down operational costs and improving the performance and robustness of embodiments. Moreover, the graph format used by certain embodiments, allows the translation of domain and enterprise specific concepts, phenomena, and issues into tangible, quantifiable, and verifiable hypotheses which may be examine or validate with graph based algorithms. Accordingly, embodiments may be especially useful in assessing risk and in compliance with security policies or the like.

Turning first to FIG. 1, then, a distributed networked computer environment including one embodiment of an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 100 which may shift, change, evolve, etc. leaving entitlements non optimally distributed among various users.

To assist in managing the entitlements assigned to various users and more generally in managing and assessing access risks in enterprise environment 100, an identity management system 150 may be employed. Such an identity management system 150 may allow an administrative or other type of user to define one or more identities, one or more entitlements, or one or more roles, and associate defined identities with entitlements using, for example, an administrator interface 152. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may be the same as, or different than, network 102), it will be realized that such an identity management system 150 may be deployed as part of the enterprise environment 100, remotely from the enterprise environment, as a cloud based application or set of services, or in another configuration.

An identity may thus be almost physical or virtual thing, place, person or other item that an enterprise would like to define. For example, an identity may be a capacity, groups, processes, physical locations, individual users or humans or almost any other physical or virtual entity, place, person or other item. An entitlement may be an item (e.g., token) that upon granting to a user will allow the user to acquire a certain account or privileged access level that enables the user to perform a certain function within the distributed networked enterprise computer environment 100. Thought of another way, an entitlement may be a specific permission granted within a computer system, such as access to a particular building (based on a user's key badge), access to files and folders, or access to certain parts of websites. Entitlements may also define the actions a user can take against the items they have access to, including, for example, accessing computing systems, applications, file systems, particular data or data items, networks, subnetworks or network locations, etc. Each of these identities may therefore be assigned zero or more entitlements with respect to the distributed networked computer environments.

To facilitate the assignment of these entitlements, enterprises may also be provided with the ability to define roles through the identity management system 150. A role within the context of the identity management system 150 may be a collection of entitlements. These roles may be assigned a name or identifiers (e.g., manager_1, engineer_level_2, team leader) by an enterprise that designate the type of user or identity that should be assigned such a role. By assigning a role to an identity using the identity management system 150, the identity may be assigned the corresponding collection of entitlements associated with the assigned role.

The identity management system 150 may thus store identity management data 154. The identity management data 154 stored may include a set entries, each entry corresponding to and including an identity (e.g., alphanumerical identifiers for identities) as defined and managed by the identity management system, a list or vector of entitlements or roles assigned to that identity by the identity management system, and a time stamp at which the identity management data was collected from the identity management system. Other data could also be associated with each identity, including data that may be provided from other systems such as a title, location or department associated with the identity. The set of entries may also include entries corresponding to roles, where each entry for a role may include the role identifier (e.g., alphanumerical identifier or name for the role) and a list or vector of the entitlements associated with each role. Other data could also be associated with each role, such as a title, location or department associated with the role.

Collectors 156 of the identity management system 150 may thus request or otherwise obtain data from various touchpoint systems within enterprise environment 100. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

Accordingly, the collectors 156 of the identity management system 150 may obtain or collect event data from various systems within the enterprise environment 100 and process the event data to associate the event data with the identities defined in the identity management data 154 to evaluate or analyze these events or other data in an identity management context. A user may interact with the identity management system 150 through a user interface 158 to access or manipulate data on identities, roles, entitlements, events or generally preform identity management with respect to enterprise environment 100.

As part of a robust identity management system, it is desirable to analyze the identity management data 154 associated with an enterprise 100. Specifically, it is desirable to group or duster the identities or entitlements of an enterprise 100 into peer groups such that, for example, the identities in a peer group are similar with respect to the set of entitlements assigned to the identities of that group (e.g., relative to other identities or other groups) or, to determine peer groups of entitlements such that entitlement patterns and assignment may be determined and role mining performed.

Peer grouping of the identities within an enterprise (or viewing the peer groups of identities) may allow, for example, an auditor other person performing a compliance analysis or evaluation to quantitatively and qualitatively assess the effectiveness of any applicable pre-existing polices, or lack thereof, and how strictly they are enforced. Similarly, peer grouping of entitlements may allow roles to be determined from such entitlement groups and outlier entitlements to be identified. This information may, in turn, be utilized to redefine or govern existing roles as defined in the identity management system 150 and allow users of the identity management system 150 greater visibility into the roles of the enterprise 100.

Accordingly, an identity management system 160 may include a harvester 162 and a graph generator 164. The harvester 162 may obtain identity management data from one or more identity management systems 150 associated with enterprise 100. The identity management data may be obtained, for example, as part of a regular collection or harvesting process performed at some regular interval by connecting to, and requesting the identity management data from, the identity management system 150. The identity management data stored may thus include a set entries, each entry corresponding to and including an identity as defined and managed by the identity management system, a list or vector of entitlements or roles assigned to that identity by the identity management system, and a time stamp at which the identity management data was collected from the identity management system 150. The identity management data may also include a set entries for roles, each entry corresponding to and including a role as defined and managed by the identity management system 150 and a list or vector of entitlements assigned to that role by the identity management system 150, and a time stamp at which that identity management data was collected from the identity management system 150.

Graph generator 164 may generate a peer grouped identity graph from the obtained identity management data. Specifically, in one embodiment, a property (identity) graph may be generated from the identity management data obtained from the enterprise. Each of the identities and entitlements from the most recently obtained identity management data may be determined and a node of the graph created for each identity and entitlement. An edge is constructed between every pair of nodes (e.g., identities) that shares at least one entitlement and between every pair of nodes (e.g., entitlements) that shares at least one identity. Each edge of the graph may also be associated with a similarity weight representing a degree of similarity between the identities of the respective nodes joined by that edge, or between the entitlements of the respective nodes joined by that edge. It will be noted here that while a similarity weight may be utilized on edges between both identity nodes and entitlement nodes, the similarity weight type, determination and value may be determined differently based upon the respective type of node(s) being joined that weighted edge. Accordingly, the obtained identity management data may be represented by an identity graph (e.g., per enterprise) and stored in graph data store 166.

Once the identity graph is generated by the graph generator 164, the graph may then be pruned to remove edges based on their weighting. Again, the pruning of edges between identity nodes and entitlements nodes may be accomplished in the same, or a different manner. For example, a pruning threshold utilized to prune edges between identity nodes may be different than a pruning threshold utilized to prune edges between entitlement nodes as well as across customers.

The pruned identity graph can then be used to cluster the identities into peer groups of identities or to cluster the entitlements into peer groups of entitlements. This clustering may be accomplished, for example, a community-detection algorithm. This clustering result may also be optimized by the graph generator 164 through the use of a feedback loop to optimize the pruning of the edges until a desired metric for assessing the quality of the peer groups generated exceeds a desired threshold or satisfies certain (e.g., optimization or other) criteria. It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric may all be the same or different when clustering the identity or entitlements of the entitlement graph. More generally, then, the pruning and clustering of the identity nodes of the identity graph may be performed separately from the pruning and clustering of the entitlement nodes of the identity graph. Accordingly, the property graph may comprise at least two subgraphs, the identities subgraph comprising at least the identity nodes and edges between these identity nodes and the entitlement subgraph comprising at least the entitlement nodes and edges between those entitlement nodes.

Once the peer groups of identities or entitlements are determined, the peer groups can then be stored (e.g., separately or in the property graph itself) and used by the identity management system 160. For example, each peer group of identities (also referred to herein as an identity group) may be assigned a peer group identifier and the peer group identifier associated with each identity assigned to the peer group by storing the peer group identifier in association with the node in the graph representing that identity. Similarly, each peer group of entitlements (e.g., also referred to herein as an entitlement group) may be assigned a peer group identifier and the peer group identifier associated with each entitlement assigned to the peer group by storing the peer group identifier in association with the node in the graph representing that entitlement.

An interface 168 of the identity management system 160 may use the identity graph in the graph data store 166 or associated peer groups to present one or more interface which may be used for risk assessment, as will be discussed. For example, an interface 168 may present a visual representation of the graph, the identities, entitlements, or the peer groups in the identity graph to a user of the identity management system 160 associated with enterprise 100 to assist in compliance or certification assessments or evaluation of the identities, entitlements or roles as currently used by the enterprise (e.g., as represented in identity management data 154 of identity management system 150).

Before moving on, it will be noted here that while identity management system 160 and identity management system 150 have been depicted separately for purposes of explanation and illustration, it will be apparent that the functionality of identity management systems 150, 160 may be combined into a single or a plurality of identity management system as is desired for a particular embodiment and the depiction and separation of the identity management systems and their respective functionality has been depicted separately solely for purposes of ease of depiction and description.

Figure 2:
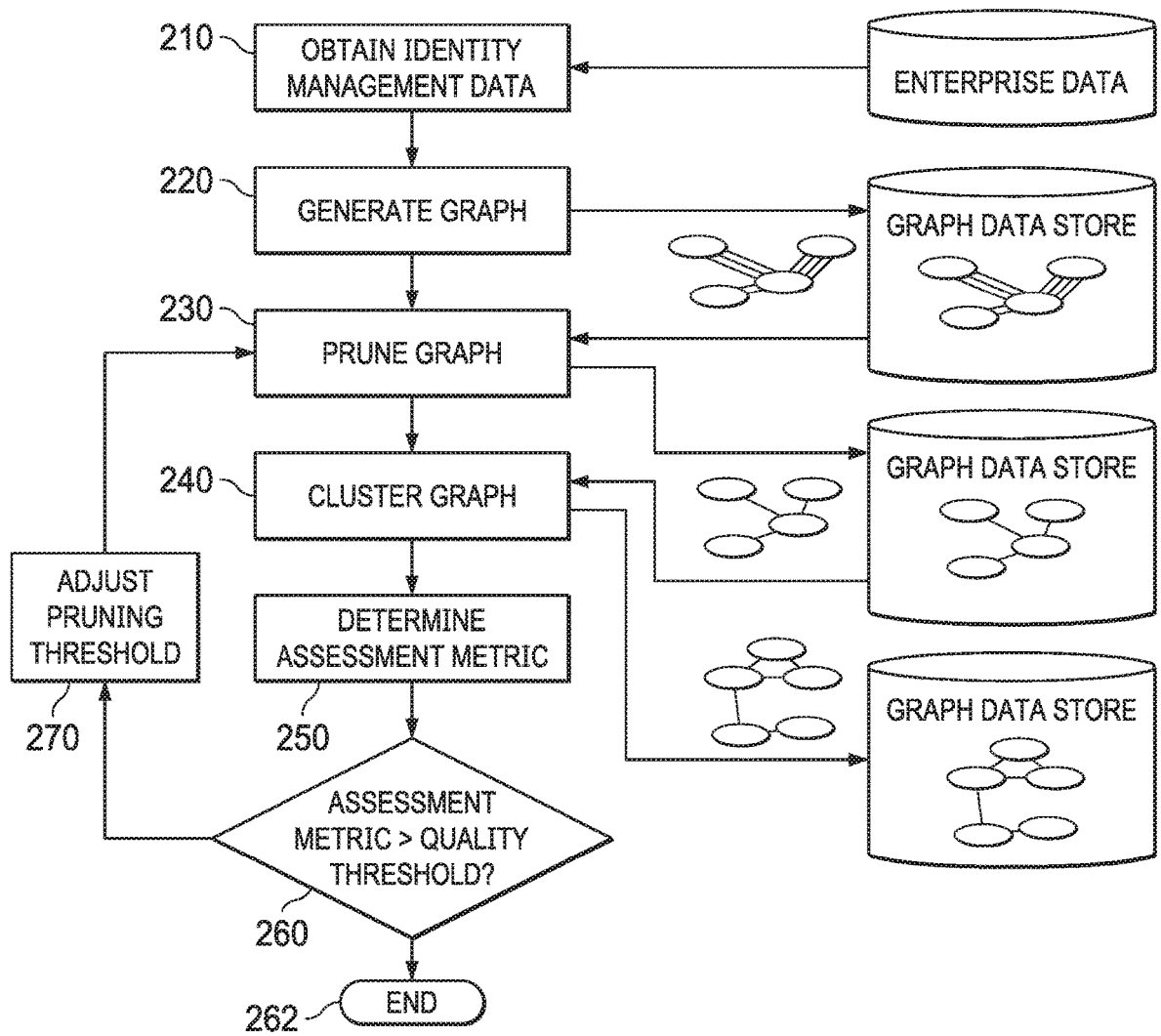
FIG. 2 is a flow diagram of one embodiment of a method for peer group detection and analysis using cluster based analysis of identity graphs.

Turning now to FIG. 2, a flow diagram for one embodiment of a method for determining peer groups of identities using a graph database is depicted. Embodiments of such a method may be employed by graph generators of identity management systems to generate identity graphs and associated peer groups from identity management data, as discussed above. It will be noted here, that while this embodiment is described in association with the determination of peer groups of identities in the identity graph, similar embodiments may be applied to entitlement nodes and associated similarity relationships of an identity graph to determine peer groups of entitlements in such an identity graph.

Initially, at step 210, identity management data may be obtained. As discussed, in one embodiment, this identity management data may be obtained from one or more identity management systems that are deployed in association with an enterprise's distributed computing environment. Thus, the identity management data may be obtained, for example, as part of a regular collection or harvesting process performed at some regular interval by connecting to, requesting the identity management data from, an identity management system. The identity management data may also be obtained on a one-time or user initiated basis.

As will be understood, the gathering of identity management data and determination of peer groups can be implemented on a regular, semi-regular or repeated basis, and thus may be implemented dynamically in time. Accordingly, as the data is obtained, it may be stored as a time-stamped snapshot. The identity management data stored may thus include a set entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from an identity management system such as a title, location or department associated with the identity. The collection of entries or identities associated with the same times stamp can thus be thought of as a snapshot from that time of the identities and entitlements of the enterprise computing environment as management by the identity management system.

As an example of identity management data that may be obtained from an identity management system, the following is one example of a Javascript Object Notation (JSON) object that may relate to an identity:

{
  "attributes": {
    "Department": "Finance",
    "costcenter": "[R01e, L03]",
    "displayName": "Catherine Simmons",
    "email": "Catherine.Simmons@demoexample.com",
    "empId": "1b2c3d",
    "firstname": "Catherine",
    "inactive": "false",
    "jobtitle": "Treasury Analyst",
    "lastname": "Simmons",
    "location": "London",
    "manager": "Amanda.Ross",
    "region": "Europe",
    "riskScore": 528,
    "startDate": "12/31/2016 00:00:00 AM UTC",
    "nativeIdentity_source_2": "source_2",
    "awesome_attribute_source_1": "source_1",
    "twin_attribute_a": "twin a",
    "twin_attribute_b": "twin b",
    "twin_attribute_c": "twin c"
  },
  "id": "2c9084ee5a8de328015a8de370100082",
  "integration_id": "iiq",
  "customer_id": "ida-bali",
  "meta": {
    "created": "2017-03-02T07:19:37.233Z",
    "modified": "2017-03-02T07:24:12.024Z"
  },
  "name": "Catherine.Simmons",
  "refs": {
    "accounts": {
      "id": [
        "2c9084ee5a8de328015a8de370110083"
      ],
      "type": "account"
    },
    "entitlements": {
      "id": [
        "2c9084ee5a8de328015a8de449060e54",
        "2c9084ee5a8de328015a8de449060e55"
      ],
      "type": "entitlement"
    },
    "manager": {
      "id": [
        "2c9084ee5a8de022015a8de0c52b031d"
      ],
      "type": "identity"
    }
  },
  "type": "identity"
}

As another example of identity management data that may be obtained from an identity management system, the following is one example of a JSON object that may relate to an entitlement:

{
  "integration_id": "bd992e37-bbe7-45ae-bbbf-c97a59194cbc",
  "refs": {
    "application": {
      "id": [
        "2c948083616ca13a01616ca1d4aa0301"
      ],
      "type": "application"
    }
  },
  "meta": {
    "created": "2018-02-06T19:40:08.005Z",

```
"modified": "2018-02-06T19:40:08.018Z"
},
"name": "Domain Administrators",
"attributes": {
    "description": "Domain Administrators group on
        Active Directory",
    "attribute": "memberOf",
    "aggregated": true,
    "requestable": true,
    "type": "group",
    "value": "cn=Domain Administrators,dc=domain,
        dc=local"
},
"id": "2c948083616ca13a01616ca1f1c50377",
"type": "entitlement",
"customer_id":          "3a60b474-4f43-4523-83d1-
    eb0fd5718287"
}
```

At step 220 an identity graph may be generated from the identity management data obtained from the enterprise. Specifically, each of the identities and entitlements from the most recent snapshot of identity management data may be obtained and a node of the graph created for each identity and entitlement. An edge is constructed between every pair of identity nodes (e.g., identities) that shares at least one entitlement (e.g., an edge connects two identity nodes if and only if they have at least one entitlement in common). An edge may also be constructed between every pair of entitlement nodes (e.g., entitlements) that shares at least one identity (e.g., an edge connects two entitlement nodes if and only if they have at least one identity in common).

Each edge of the graph joining identity nodes or entitlement nodes may be associated with a similarity weight representing a degree of similarity between the identities or entitlements of the respective nodes joined by that edge. For identity nodes, the similarity weight of an edge joining the two identity nodes may be generated based on the number of entitlements shared between the two joined nodes. As but one example, the similarity weight could be based on a count of the similarity (e.g., overlap or intersection of entitlements) between the two identities divided by the union of entitlements. Similarly, for identity nodes, the similarity weight of an edge joining the two entitlement nodes may be generated based on the number of identities shared between the two joined nodes. As but one example, the similarity weight could be based on a count of the similarity (e.g., overlap or intersection of identities) between the two entitlements divided by the union of identities. For instance the similarity could be defined as the ratio between a number of identities having both entitlements joined by the edge to the number of identities that have either one (e.g., including both) of the two entitlements.

In one embodiment, the edges are weighted via a proper similarity function (e.g., Jaccard similarity). In one embodiment, a dissimilarity measure, of entitlement or identity binary vectors, d, may be chosen, then the induced similarity, $1-d(x,y)$, may be used to assign a similarity weight to the edge joining the nodes, x,y. Other methods for determining a similarity weight between two nodes are possible and are fully contemplated herein. Moreover, it will be noted here that while a similarity weight may be utilized on edges between both identity nodes and entitlement nodes, the similarity weight type, determination and value may be determined differently based upon the respective type of node(s) being joined that weighted edge.

In one specific, embodiment, a symmetric matrix for identities (e.g., an identity adjacency matrix) may be determined with each of the identities along each axis of the matrix. The diagonal of the matrix may be all 0s while the rest of values are the similarity weights determined between the two (identity) nodes on the axes corresponding to the value. In this manner, this symmetric matrix may be provided to a graph constructor which translates the identities on the axes and the similarity values of the matrix into graph store commands to construct the identity graph. Similarly, a symmetric matrix for entitlements (e.g., an entitlement adjacency matrix) may be determined with each of the entitlements along each axis of the matrix. The diagonal of the matrix may be all 0s while the rest of values are the similarity weights determined between the two (entitlement) nodes on the axes corresponding to the value. In this manner, this symmetric matrix may be provided to a graph constructor which translates the entitlement on the axes and the similarity values of the matrix into graph store commands to construct the identity graph.

Accordingly, the identity management data may be faithfully represented by a graph, with k types of entities (nodes/vertices, e.g., identity-id, title, location, entitlement, etc.) and stored in a graph data store. It will be noted that graph data store 132 may be stored in any suitable format and according to any suitable storage, including, for example, a graph store such a Neo4j, a triple store, a relational database, etc. Access and queries to this graph data store may thus be accomplished using an associated access or query language (e.g., such as Cypher in the case where the Neo4j graph store is utilized).

Once the identity graph is generated, the graph may then be pruned at step 230. Here, the identity graph may be pruned to remove weak edges (e.g., those edges whose similarity weight may fall below a pruning threshold). The pruning of the graph is associated with the locality aspect of identity governance, where an identity's access entitlements should not be directly impacted, if at all, by another identity with strongly dissimilar entitlement patter (e.g., a weak connecting edge) or that determined should be based on strong commonality or popularity of entitlements within an identity grouping. Accordingly, the removal of such edges may not dramatically alter the global topology of the identity graph. An initial pruning threshold may be initially set or determined (e.g., as 50% similarity or the like) and may be substantially optimized or otherwise adjusted at a later point. As another example, a histogram of similarity weights may be constructed and a similarity weight corresponding to a gap in the similarity weights of the histogram may be chosen as an initial pruning threshold. Again, the pruning of edges between identity nodes and entitlements nodes may be accomplished in the same, or a different manner. For example, the pruning threshold utilized to prune edges between identity nodes may be different than a pruning threshold utilized to prune edges between entitlement nodes.

The pruned identity graph can then be used to cluster the identities or entitlements into peer groups of identities or peer groups of entitlements at step 240. Within this graph approach, a representation of a peer group of identities could be represented by a maximal clique, where every identity is strongly connected (e.g., similar) to every other identity within the identity peer group, and consequently, members of the clique all share a relatively large, and hence dominant, common core of entitlements. A representation of an entitlement peer group could be represented by a maximal clique, where every entitlement is strongly connected (e.g., similar) to every other entitlement within the peer group, and consequently, members of the clique all share a relatively large, and hence dominant, common core of identities. The problem of finding all maximal cliques of a graph may, however, be a memory and computationally intensive problem. Most clique related problems in graph theory are hard and some of them are even NP-complete, requiring exponential time to finish as graphs with exponentially many maximal cliques may exist.

Accordingly, in one embodiment a community-detection algorithm may be utilized for peer grouping the identities or entitlements of the identity graph to speed the determination of the peer groups, reduce computational overhead and conserve memory, among other advantages. A plethora of applicable and performant community-detection and graph clustering algorithms may be utilized according to certain embodiments. Some of these algorithms are specifically targeted to large graphs, which can be loosely described as graphs with at least tens or hundreds (or more) of thousands of nodes and millions of edges. Such graph community-detection algorithms may include, for example, Louvain, Leiden, Fast-greedy, Label Propagation or Stochastic Block Modeling. Other graph community detection algorithms may be utilized and are fully contemplated herein.

In certain embodiments, a clustering result may be optimized through the use of a feedback loop, as discussed below. As such, in one embodiment it may be desirable to utilize a community-detection algorithm for determination of the peer groups that may provide allow a straightforward determination of a peer group assessment metric for a quality assessment of determined peer groups or the identity graph. Accordingly, a community-detection algorithm that may be based on, or allow a determination of, a graph based metric (e.g., modularity, evolving topology, connected components, centrality measures (e.g., betweenness, closeness, community overlap measures such as NMI or Omega indices)) that may be used as a peer group assessment metric may be utilized.

Specifically, in one embodiment, the Louvain algorithm may be utilized as a community-detection algorithm and modularity may be used as a peer assessment metric. The Louvain algorithm may not only be a scalable algorithm that can handle, and be efficient on, large graphs; but additionally the Louvain algorithm may be based on modularity or be modularity optimized. Modularity is a scalar that can be determined for a graph or groups or subgraphs thereof. This modularity reflects a likelihood of the clusters generated (e.g., by the algorithm) to not have been generated by random chance. A high modularity value, (e.g., positive and away from 0) may indicate that the clustering result is unlikely to be a product of chance. This modularity can thus be used as a peer group assessment metric.

Moreover, in addition to the application of a peer group assessment metric to optimize the peer groups or identity graphs determined using such community-detection algorithms, an identity management system may employ alerts based these peer group assessment metrics. For example, an alert to a user may be based on an alert threshold (e.g., if the peer group assessment metric drops below or above a certain threshold) or if any changes over a certain threshold occur with respect to the peer group assessment metric. For example, setting an empirical low threshold for modularity, with combined user alerts, could serve as a warning for deteriorating quality of peer groups or the identity graph. This could be due to input data has been corrupted at some point in pipeline, or in other cases, that the access entitlement process for the particular enterprise is extremely lacking due discipline. Regardless of the underlying cause, such an early warning system may be valuable to stop the propagation of questionable data quality in the peer group assessment and determination process and more generally to identity management goals within the enterprise.

In many cases, the community-detection or other clustering algorithm utilized in an embodiment may fall under the umbrella of what are usually termed unsupervised machine-learning. Results of these types of unsupervised learning algorithms may leave some room for interpretation, and do not, necessarily or inherently, provide outputs that are optimized when the domain or context in which they are being applied are taken into account. Consequently, to mitigate some of these issues and to optimize the use of the peer groups and identity graphs in an identity governance context, embodiments of identity management systems employing such peer groups of identities or entitlements using an identity graph may allow some degree of user configuration, where at a least a portion of the user configuration may be applied in the graph determination, peer-grouping or optimization of such peer group determination.

This configurability may allow the user of an identity management system to, for example, impose some constraints or set up certain configuration parameters for the community-detection (or other peer grouping) algorithm in order to enhance the clustering results for a particular use-case or application. A few non-exhaustive examples of user configuration are thus presented. A user may have a strongly defined concept of what constitutes a 'peer'. This may entail that the user's specification of what continues a peer may be used to derive a pruning threshold with statistical methods (e.g., rather than relying on modularity).

As another example of configurability, a user may elect to opt for a hierarchical clustering output, or that peer groups should have certain average size, which may entail to allowing for several consecutive iterations of the community-detection algorithm to be performed (as will be explained in more detail herein). A user may also elect to run the peer grouping per certain portions of the identities or entitlements, versus running it for all identities or entitlements. The filtered population of identities or entitlements may be specified in terms of geographic location, business role, business unit, etc. Similarly, a user may elect to filter the outputs of the community-detection algorithm in terms of certain identity or entitlement attributes, e.g., identity role, identity title, identity location, etc. The results might then be quantitatively and qualitatively contrasted against existing governance policies to measure, assess and certify compliance with these policies.

Generally then, a user may elect to utilize the peer grouping feature in combination with other tools of identity governance, in order to gain more insight into the quality of identity governance policy enforcement within the business. This entails that peer grouping should be configurable and flexible enough to allow it to be paired with other (e.g., third-party) identity management tools. Accordingly, certain restrictions may be imposed on the identity graph's or peer group's size, format, level of detail, etc.

In any event, once the peer groups of identities or entitlements of the pruned identity graph are used to cluster the identities into peer groups of identities at step 240 the determined peer groups can then be stored (e.g., separately or in the identity graph itself) and used by the identity management system. For example, each peer group (e.g., or identities or entitlements) may be assigned a peer group identifier and the peer group identifier associated with each identity assigned to the peer group by storing the peer group identifier in association with the node in the graph representing that identity or entitlement.

As an example of use a visual representation of the graph, the identities, entitlements or the peer groups in the identity graph may be presented to a user of the identity management to assist in compliance or certification assessments or evaluation of the identities and entitlements as currently used by the enterprise. In principle, strictly enforced pre-existing governance policies should ensure that identities with strongly similar access privileges are strongly similar (e.g., are in the same peer group). The presentation of such peer groups may thus, for example, allow an auditor or compliance assessor to quantitatively and qualitatively assess the effectiveness of any applicable pre-existing polices, or lack thereof, and how strictly they are enforced.

During such collection, graph determination and peer grouping steps, in certain embodiments, a number of efficiencies may be implemented to speed the collection process, reduce the amount data that must be stored and to reduce the computer processing overhead and computing cycles associated with such data collection, graph determination and peer grouping of such data. Specifically, in one embodiment, a delta change assessment may be performed when identity management data is collected or peer groups are determined in a current time period. More specifically, if identity management data was collected in a previous time period, or a previous peer grouping has been performed on identities or entitlements of a previously created identity graph, an assessment can be made (e.g., by a data querying script or process) of the difference (or delta) between the set of identities or entitlements corresponding to the most recent previous snapshot and the set of identities or entitlements obtained in the current time period. This assessment may comprise a determination of how many changes to the identities, associated entitlements or other attributes have occurred between the time of the previous snapshot and the current snapshot (e.g., the most recently identity management data collected in the current time period).

An assessment may also be made of the difference between the peer groups determined from the most recent previous snapshot and the peer groups obtained in the current time period. This assessment may comprise a determination of how many identities or entitlements are associated with different peer groups (e.g., relative to the peer grouping of identities or entitlements determined from the previous most recent snapshot), changes to the identities or entitlements or how many new identities are associated with an established (or new) peer group.

If there are no determined changes, or the changes are below some threshold number, or are few, local, or insignificant to a large majority of existing peer groups, then no action is needed other than updating the affected identities or entitlements in the data of the previous snapshot or the identity graph. New entries in the entries comprising the current snapshot of identities or entitlements may be created for any newly identified identities or entitlements. Additionally, nodes in the graph corresponding to new identities or entitlements can be appended to an appropriate peer group based on how similar this new identity to existing peer groups, (e.g., assign the new identity the peer group of the same department/title).

If the differences (e.g., number of changes, new identities, different peer group assignments, etc.) are non-trivial, affecting a multitude of identities across peer groups, then a new peer grouping process may occur on the newly refreshed data. In such case, a detection algorithm may be used to evolve, and persist, previously determined peer groups into their recent counterparts. This can be done by monitoring certain 'marker' identities, e.g., influencers, or identities with high centrality values and/or high degree of connections, in both versions of peer groups. Utilizing a majority vote approach, it can be determined how previous peer groups evolve into newer ones. Expected updated versions of the previous peer group, include splitting, merging, growth, shrinkage. Newer split peer groups may, for example inherit the 'old' peer group identifiers.

Embodiments of such a delta detection and updating mechanisms may have the further advantage of allowing the quality and stability of each peer group to be monitored by an identity management system via tracking the peer groups or identity graph, the changes thereto, or their evolution over time. By actively monitoring and assessing the degree of these changes between two or more consecutive versions of a peer group or identity graph, deteriorating quality issues may be detected as they arise or manifest in the identity graph or peer groups determined therefrom. Similarly, using the identity graphs, peer groups or peer group assessment metrics determined therefrom, a graph evolution model may be built in certain embodiments, (e.g., based on epidemiology susceptible, infected and recovered type models). Comparing the observed evolution of identities, entitlements or peer groups versus theoretical predictions may provide another tool to war users of an identity management system against rapid or extreme changes that may negatively impact the quality of peer groups or identity management more generally.

Again, once the peer groups of identities or entitlements are determined from the pruned identity graph and stored (at step 240), a peer group assessment metric may be determined based on the identity graph or the determined peer groups at step 250. As discussed, this peer group assessment metric may be determined separately based on the peer groups or identity graph determined, or may be metric utilized by a community-detection algorithm, such that the peer group assessment metric may be determined as part of the peer group determination process. In certain embodiments then, the application of a community-detection algorithm may result in such a peer group assessment metric (e.g., modularity, evolving topology, connected components, centrality measures e.g., betweenness, closeness, community overlap measures (e.g., NMI, Omega indices)) that may be used as a peer group assessment metric may be utilized.

For example, as discussed above the Louvain algorithm may be a graph-based modularity optimized community-detection algorithm. Thus, a modularity associated with the determined peer groups may result from the determination of the peer group using the Louvain algorithm. Modularity is a scalar that can be determined for a graph or groups or subgraphs thereof and reflects a likelihood of the clusters generated (e.g., by the algorithm) to not have been generated by random chance. A high modularity value, (e.g., positive and away from 0) may indicate that the clustering result is unlikely to be a product of chance. This modularity can be used as a peer group assessment metric in one embodiment.

Accordingly, in certain embodiments, the clustering of identities or entitlements into peer groups may be optimized based on this peer group assessment metric. Specifically, a feedback loop may be utilized to determine the optimal pruning threshold. The optimization loop may serve to substantially increase or maximize the quality of the graph clustering, with respect to certain proper metrics (e.g., graph modularity or other peer group assessment metric). Additional domain-specific, per enterprise, criteria may be utilized in this step in certain embodiments in order to render clustering results that accurately reflect certain requirements to better serve a particular enterprise or use of the peer groups or identity graph.

For instance, in one embodiment if the peer group assessment metric is above (or below) a quality threshold at step 260 the determination of peer groups of identities or entitlements for the obtained in the current snapshot may end at step 262. The determined peer groups of identities or entitlements can then be stored (e.g., separately or in the identity graph) and used by the identity management system.

However, if the peer group assessment metric is below (or above) a quality threshold at step 260 a feedback loop may be instituted whereby the pruning threshold is adjusted by some amount at step 270 (up or down) and the originally determined identity graph is again pruned based on the adjusted pruning threshold (or the previously pruned identity graph may be further pruned) at step 230. The adjustment of the pruning threshold may be based on a wide variety of criteria in various embodiments and may be adjust be a fixed or differing amount in every iteration through the feedback loop. Additionally, in some embodiments, various machine learning techniques (e.g., unsupervised machine learning techniques such as k-means, method of moments, neural networks, etc.) may be used to determine an amount to adjust the pruning threshold or a value for the adjusted pruning threshold). This newly pruned identity graph can then be clustered into new peer groups of identities or entitlements at step 240 and a peer group assessment metric determined at step 250 based on the newly pruned identity graph or the newly determined peer groups.

If this new peer assessment metric is now above (or below) the quality threshold at step 260 the feedback loop may be stopped and the determination of peer groups of identities or entitlements for the data obtained in the current snapshot may end at step 262. These peer groups of identities or entitlements can then be stored (e.g., separately or in the identity graph) and used by the identity management system.

Otherwise, the feedback loop may continue by again adjusting the pruning threshold further at step 270 (e.g., further up or further down relative to the previous iteration of the feedback loop), re-pruning the identity graph based on the adjusted pruning threshold at step 230, clustering this newly pruned graph at step 240, determining another peer group assessment metric at step 250 and comparing this metric to the quality threshold at step 260. In this manner, the feedback loop of adjustment of the pruning threshold, re-pruning the graph and re-clustering the identity graph into peer groups may be repeated until the peer group assessment metric reaches a desired threshold. Moreover, by tailoring the peer group assessment metric and quality threshold to include or reflect domain or enterprise specific criteria (e.g., which may be specified by a user of the identity management system), the clustering results (e.g., the peer groups resulting from the clustering) may more accurately reflect particular requirements or the needs of a particular enterprise or be better tailored to a particular use.

Once the feedback loop is ended (step 262) the determined peer groups of identities or entitlements can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric (e.g., steps 230, 240, 250, 260 and 270) may all be performed the same or differently when clustering the identity or entitlements of the entitlement graph. More generally, then, the pruning and clustering of the identity nodes of the identity graph may be performed separately from the pruning and clustering of the entitlement nodes of the identity graph. In certain embodiments, for example, the pruning and clustering (e.g., steps 230, 240, 250, 260 and 270) of the identity nodes of the identity graph may be performed as a separate process from the pruning and clustering (e.g., steps 230, 240, 250, 260 and 270) of the entitlement nodes of the identity graph. Accordingly, the identity graph may be comprised of at least two subgraphs, the identities subgraph comprising at least the identity nodes and edges between these identity nodes and the entitlement subgraph comprising at least the entitlement nodes and edges between those entitlement nodes.

It may now be helpful to look at such visual depictions and presentations of identity graphs or interfaces that may be created or presented based on such identity graphs. It will be apparent that these depictions and interfaces are but example of depictions and interfaces that may presented or utilized, and that almost any type of presentation, depiction or interface based on the identities, entitlements, peer groups or other associated data discussed may be utilized in association with the embodiments of identity management systems disclosed herein.

As discussed, embodiments of the identity management systems as disclosed may create, maintain or utilize identity graphs. These identity graphs may include a graph comprised of nodes and edges, where the nodes may include identity management nodes representing, for example, an identity, entitlement or peer group, and the edges may include relationships between these identity management nodes. The relationships represented by the edges of the identity graph may be assigned weights or scores indicating a degree of similarity between the nodes related by a relationship, including, for example, the similarity between two nodes representing an identity or two nodes representing an entitlement, as discussed. Additionally, the relationships may be directional, such that they may be traversed only in a single direction, or have different weightings depending on the direction in which the relationship is traversed or the nodes related. Embodiments of such an identity graph can thus be searched (or navigated) to determine data associated with one or more nodes. Moreover, the similarity between, for example, the identities or entitlements may be determined using the weights of the relationships in the identity graph.

Specifically, in certain embodiments, a property graph may be thought of as a graph comprising a number of interrelated nodes. These nodes may include nodes that may have labels defining the type of the node (e.g., the type of "thing" or entity that the node represents, such as an identity, entitlement or peer group) and properties that define the attributes or data of that node. For example, the labels of the nodes of an identity graph may include "Identity", "Entitlement" or "PeerGroup". Properties of a node may include, "id", "company", "dept", "title", "location", "source" "size", "clique", "mean_similarity", or the like.

The nodes of the property graph may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of an identity graph may include "Similarity" or "SIM", "Has_Entitlement" or "HAS_ENT", "Belongs_To_PeerGroup" or "BELONGS_TO_PG", or the like.

Figure 3A:
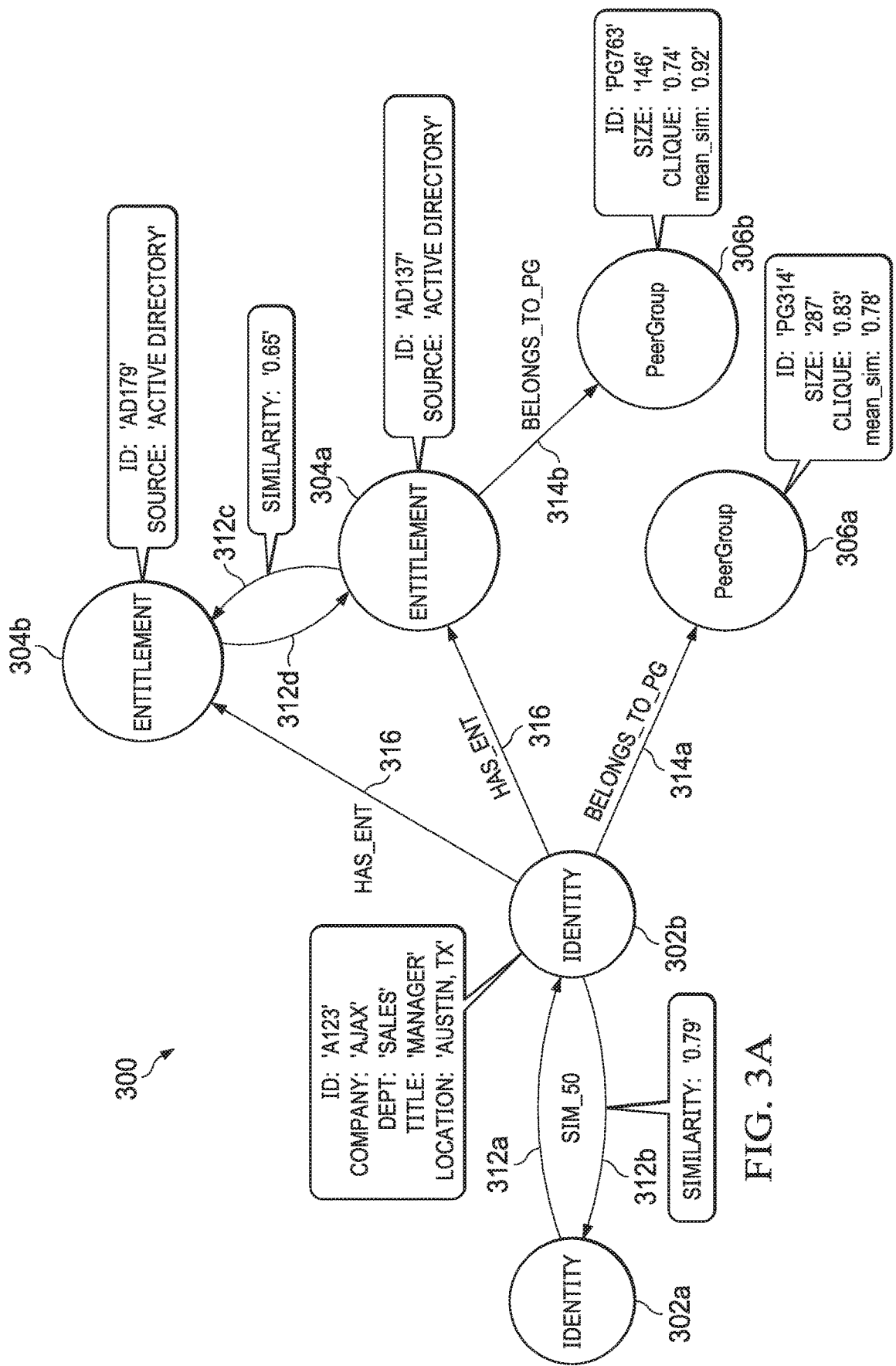
FIGS. 3A, 3B, 3C, 3D and 3E depict example visual representations of identity graphs.

Referring then to FIG. 3A, a graphical depiction of a portion of an example identity graph 300 is depicted. Here, nodes are represented by circles and relationships are represented by the directional arrows between the nodes. Such an identity graph 300 may represent identities, entitlements or peer groups, their association, and the degree of similarity between identities represented by the nodes. Thus, for example, the identity nodes 302a, 302b have the label "Identity" indicating they are identity nodes. Identity node 302b is shown as being associated with a set of properties that define the attributes or data of that identity node 302b, including here that the "id" of identity node 302b is "a123", the "company" of identity node 302b is "Ajax", the "dept" of identity node 302b is "Sales", the "title" of identity node 302b is "Manager", and the "location" of identity node 302b is "Austin, Tex.".

These identity nodes 302 of the identity graph 300 are joined by edges formed by directed relationships 312a, 312b. Directed relationship 312a may represent that the identity of identity node 302a is similar to (represented by the labeled "SIM" relationship 312a) the identity represented by identity node 302b. Similarly, directed relationship 312b may represent that the identity of identity node 302b is similar to (represented by the labeled "SIM" relationship 312b) the identity represented by identity node 302a. Here, relationship 312b has been assigned a similarity weight of 0.79. Notice that while these relationships 312a, 312b are depicted as individual directional relationships, such a similar relationship may be a single bidirectional relationship assigned a single similarity weight Entitlement nodes 304a, 304b have the label "Entitlement" indicating that they are entitlement nodes. Entitlement node 304a is shown as being associated with a set of properties that define the attributes or data of that entitlement node 304a, including here that the "id" of entitlement node 304 is "ad137", and the "source" of entitlement node 304a is "Active Directory". Entitlement node 304b is shown as being associated with a set of properties that define the attributes or data of that entitlement node 304b, including here that the "id" of entitlement node 304b is "ad179", and the "source" of entitlement node 304a is "Active Directory".

These entitlement nodes 304 of the identity graph 300 are joined by edges formed by directed relationships 312c, 312d. Directed relationship 312c may represent that the entitlement node 304a is similar to (represented by the labeled "SIM" relationship 312c) the entitlement represented by entitlement node 304b. Similarly, directed relationship 312d may represent that the entitlement of entitlement node 304b is similar to (represented by the labeled "SIM" relationship 312d) the entitlement represented by entitlement node 304a. Here, relationship 312c has been assigned a similarity weight of 0.65. Notice that while these relationships 312c, 312d are depicted as individual directional relationships, such a similar relationship may be a single bidirectional relationship assigned a single similarity weight.

Identity node 302b and entitlement nodes 304a, 304b of the identity graph 300 are joined by edges formed by directed relationships 316, 316. Directed relationships 316 may represent that the identity of identity node 302b has (represented by the labeled "HAS_ENT" relationships 316) the entitlements represented by entitlement nodes 304a, 304b.

Peer group node 306a has the label "PeerGroup" indicating that it is a peer group node. Peer group node 306a is shown as being associated with a set of properties that define the attributes or data of that peer group node 306a, including here that the "id" of peer group node 306a is "pg314", the "size" of peer group node 306a is "287", the "clique" of peer group node 306a is "0.83" and the "mean_sim" or mean similarity value of peer group node 306a is "0.78". Identity node 302b and peer group node 306a of the identity graph 300 are joined by an edge formed by directed relationship 314a. Directed relationship 314a may represent that the identity of identity node 302b belongs to (represented by the labeled "BELONGS_TO_PG" relationship 314a) the peer group represented by peer group node 306a.

Peer group node 306b has the label "PeerGroup" indicating that it is a peer group node. Peer group node 306b is shown as being associated with a set of properties that define the attributes or data of that peer group node 306b, including here that the "id" of peer group node 306b is "pg763", the "size" of peer group node 306b is "146", the "clique" of peer group node 306b is "0.74" and the "mean_sim" or mean similarity value of peer group node 306b is "0.92". Entitlement node 304a and peer group node 306b of the identity graph 300 are joined by an edge formed by directed relationship 314b. Directed relationship 314b may represent that the identity of entitlement node 304a belongs to (represented by the labeled "BELONGS_TO_PG" relationship 314b) the peer group represented by peer group node 306b.

Figure 3B:
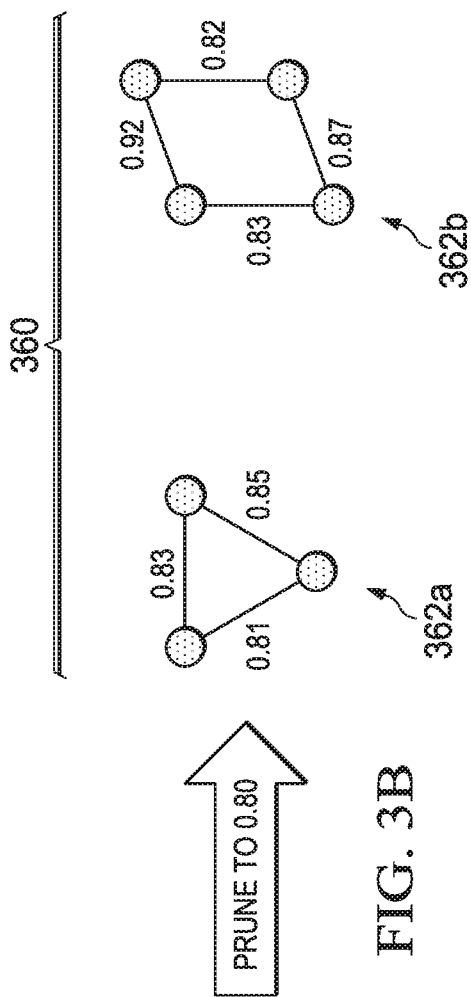
Figure 3B:
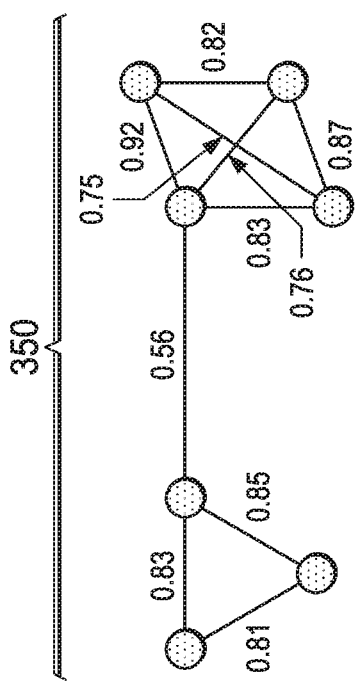

FIG. 3B is a graphical depiction of an entitlement graph and the subgraphs or clusters that may result from different pruning thresholds. In particular, entitlement graph 350 may be an initial cluster of entitlement nodes with edges having similarity weights (e.g., which may be determined as discussed) where the entitlement graph has been pruned initially and clustered according to a 0.5 pruning threshold for the similarity weight. Entitlement graph 360 is a result of pruning the entitlement graph 350 according to a higher pruning threshold of 0.8 and clustering. Here, two subgraphs 362a, 362b may result from such a pruning.

Figure 3C:
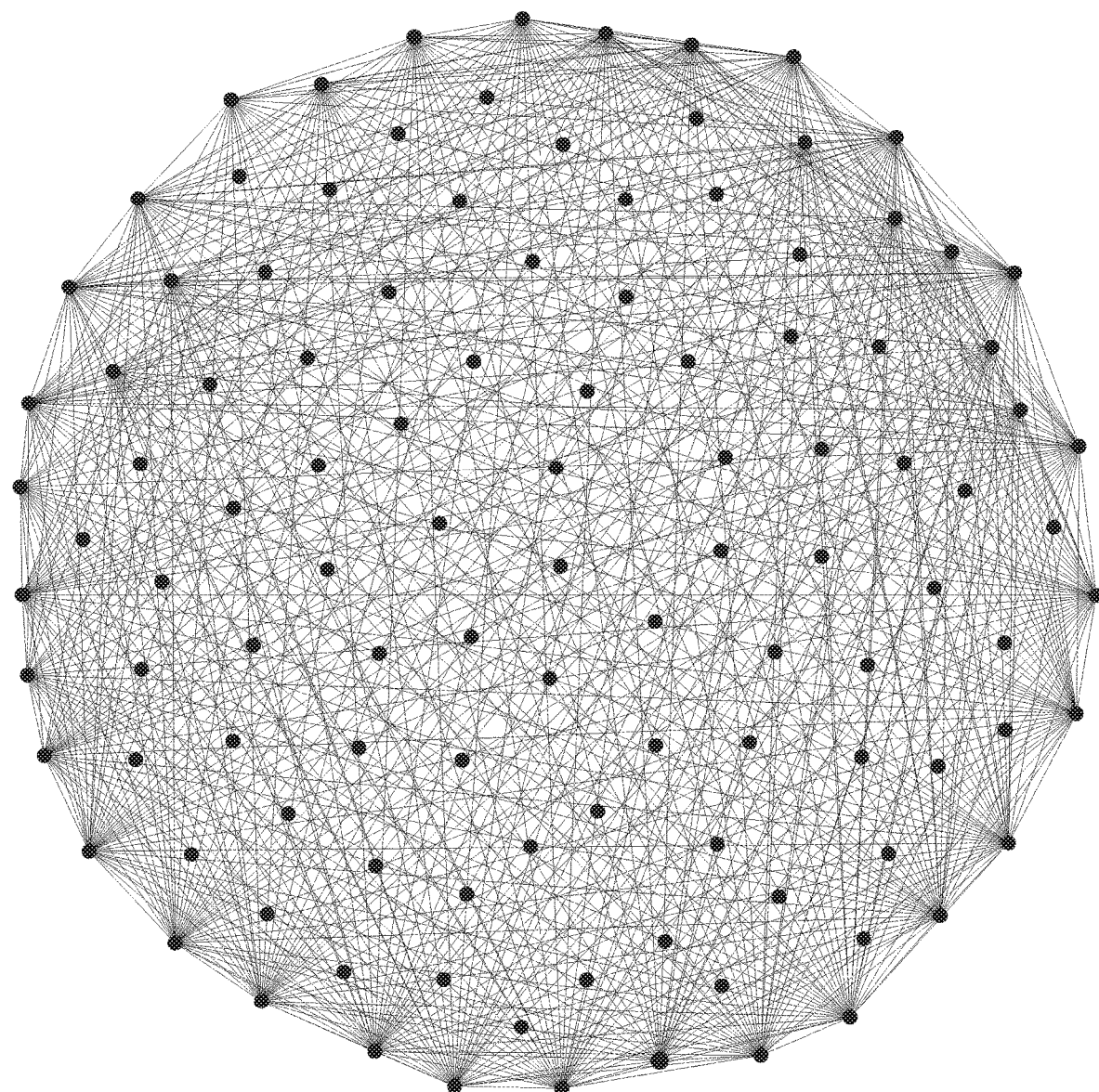
Figure 3D:
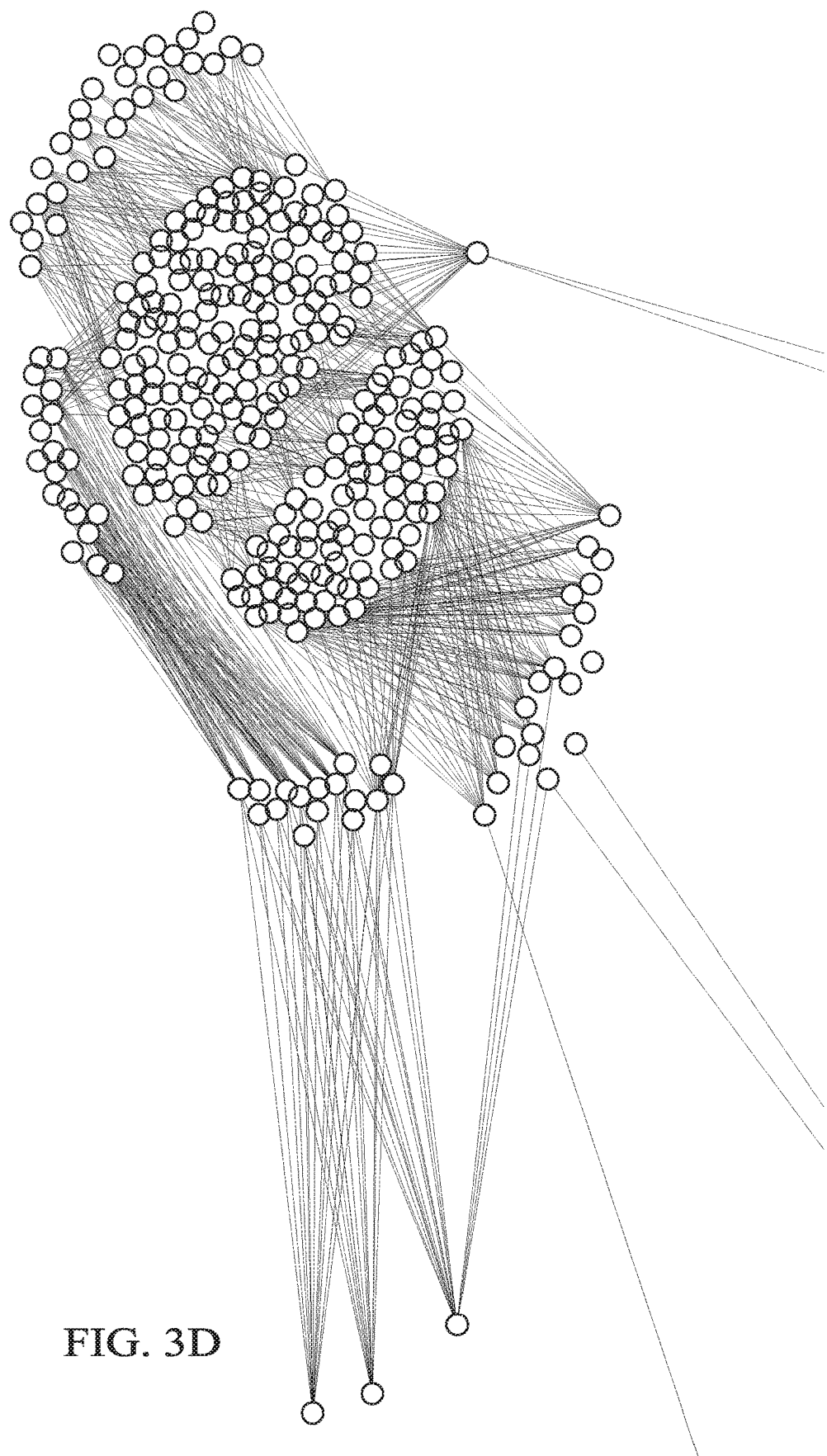
Figure 3E:
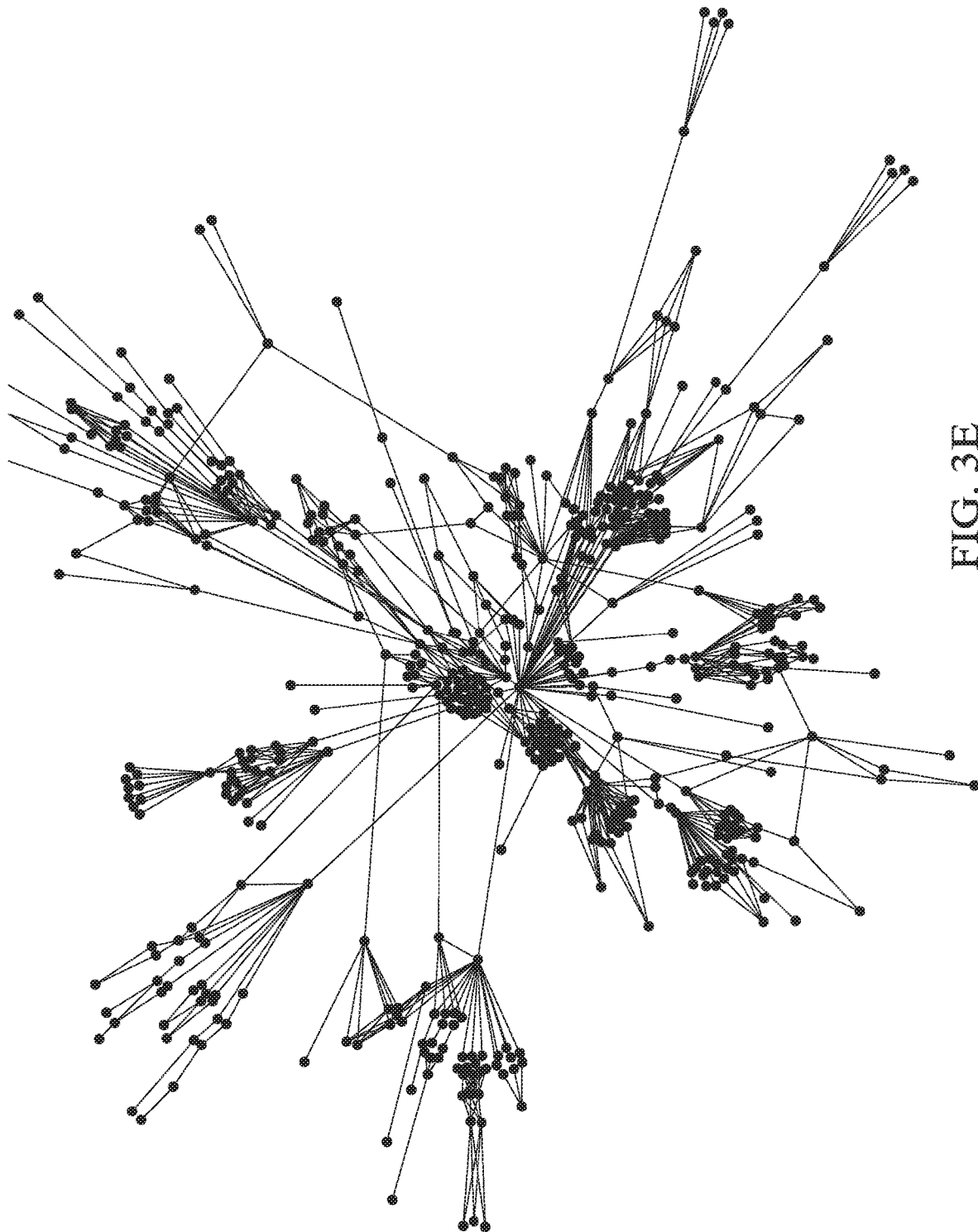

Now referring to FIGS. 3C, 3D and 3E, example representations of peer groupings within identity graphs are depicted. Here, each identity node of an identity graph is represented by a circle and each edge is represented by a line joining the nodes. In these visual depictions, the closer the nodes the higher the similarity value between the nodes. Such visual depictions when presented to a user may allow a user to better perceive the number of identities utilized by an enterprise, the relationships between those identities, the distribution of entitlements with respect to those identities or other information related to the identities or entitlements that may be utilized in identity governance and management, including for example, compliance assessment or auditing.

Figure 4:
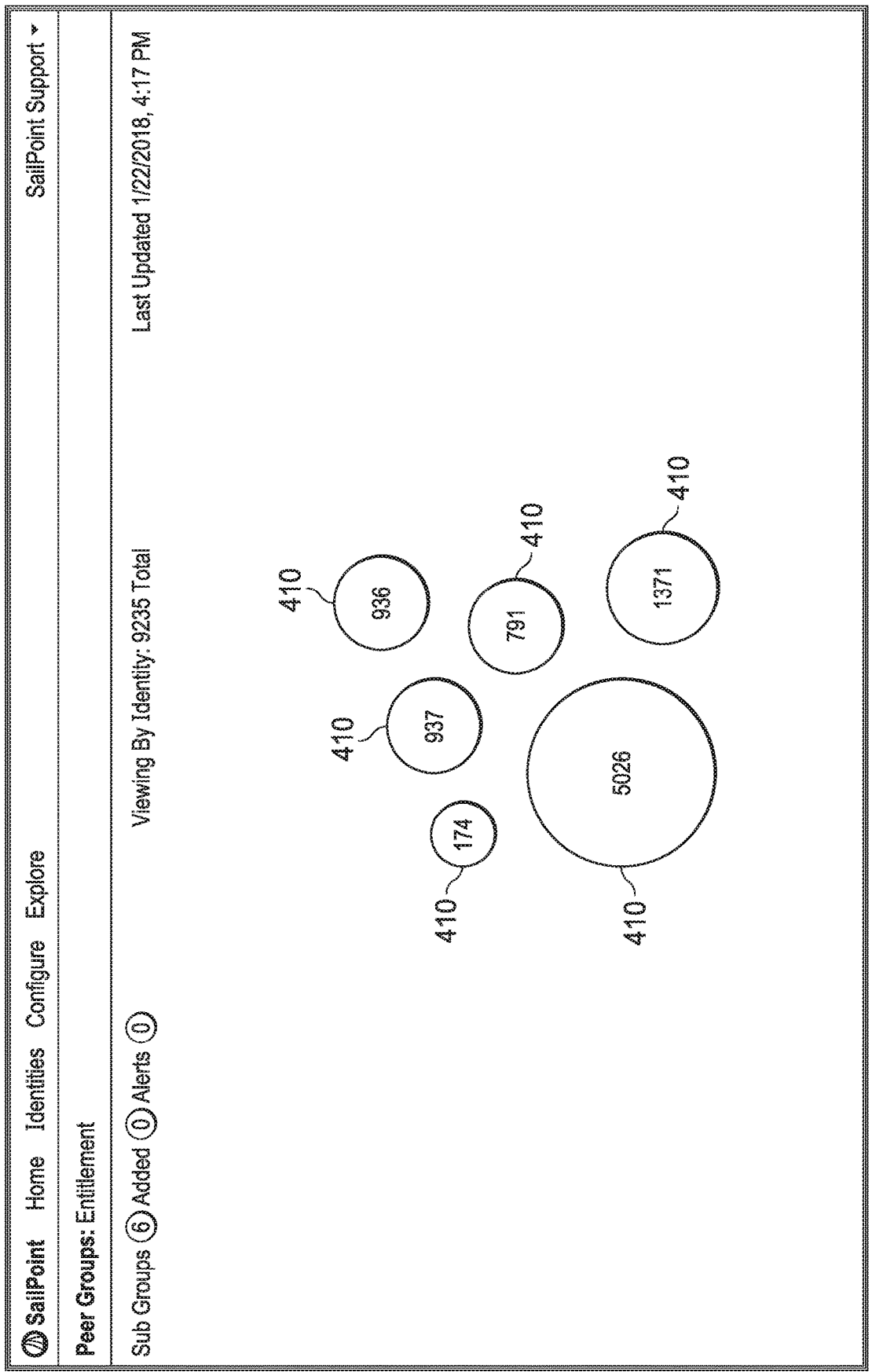
FIGS. 4-7 depict interfaces that may be utilized by embodiments of an identity management system.

FIG. 4 depicts an embodiment of an interface that may be utilized by an identity management system to visually present data regarding the peer groups determined for identities within an enterprise. In this example, the enterprise has 9235 associated identities, and the interface depicts that there are 6 peer groups of those identities that have been determined based on the entitlements associated with the identities. Each of the depicted circles 410 within the interface represents one of the peer groups and displays the number of identities associated with each of those peer groups. Moreover, the size and location of each circle 410 may depict the relative size of the peer groups of the identities and the number of entitlements shared between those peer groups, or identities within those peer groups.

Figure 5:
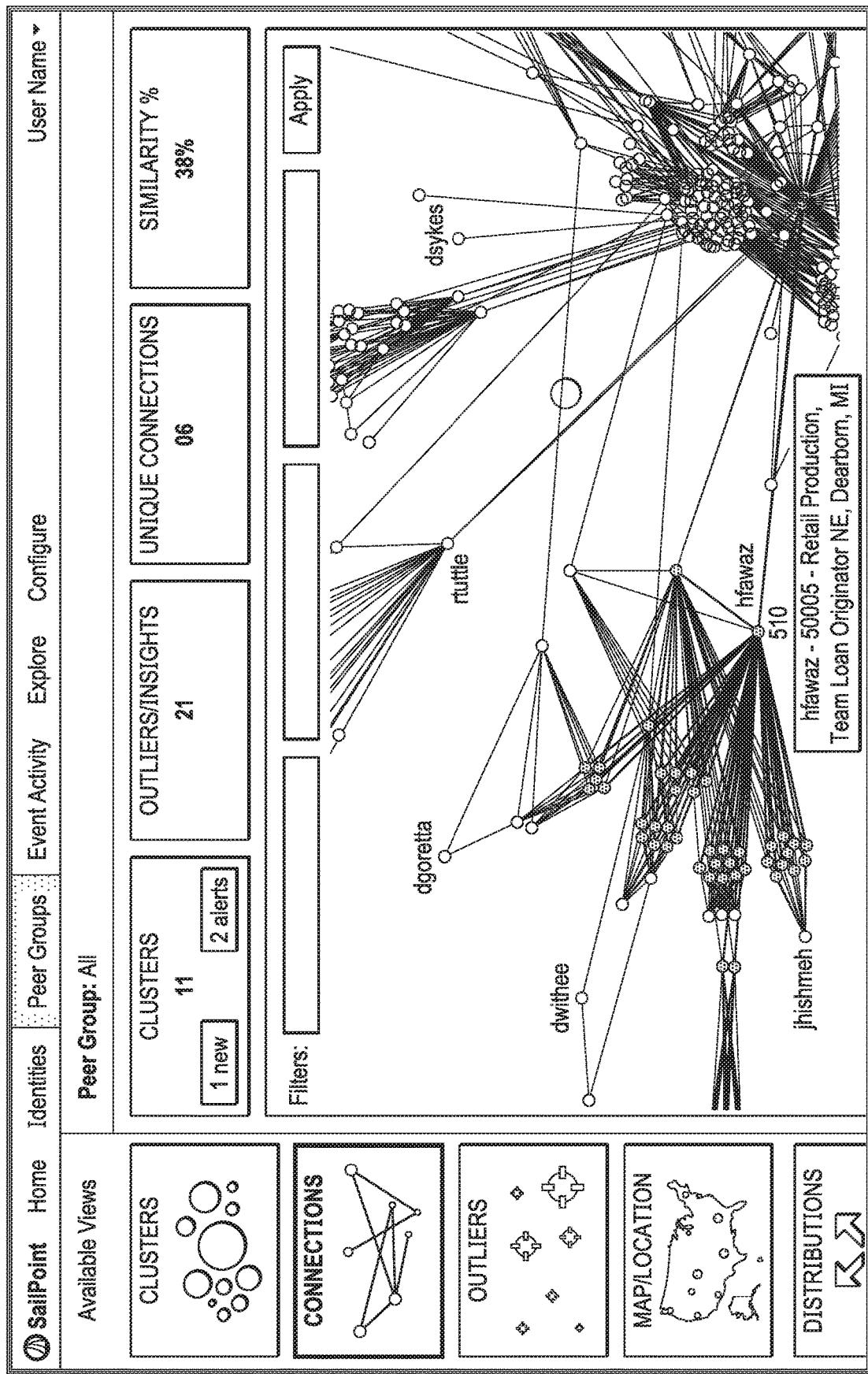

FIG. 5 depicts an embodiment of interface that may be utilized by an identity management system to visually present data regarding the peer groups determined for identities within an enterprise. Here, the interface may present a visual representation of the identity graph as discussed above where each identity node is represented by a circle and each edge is represented by a line joining the nodes, where the closer the nodes the higher the similarity value between the nodes. The interface may also present information regarding the number of peer groups (dusters) determined for the identity graph being presented (in this example 11).

The interface, or a portion thereof, may allow the user to navigate around the identity graph and "drill down" to obtain information on a represented node or entitlement. In the depicted example, the user has hovered above a node 510 of the identity graph and information about that identity is presented through the interface to the user. By looking at such an identity graph a user may be able to discern, for example, which identities which may be "highly contagious" or represent other identity management risks or compliance issues. An identity may be "highly contagious" or otherwise represent an identity governance risk, for example, if that identity has a number or type of entitlements such that if those identities are replicated without identity governance oversight (e.g., assigned to other users) it may cause identity governance issues such as unintended entitlement bloom.

Figure 6:
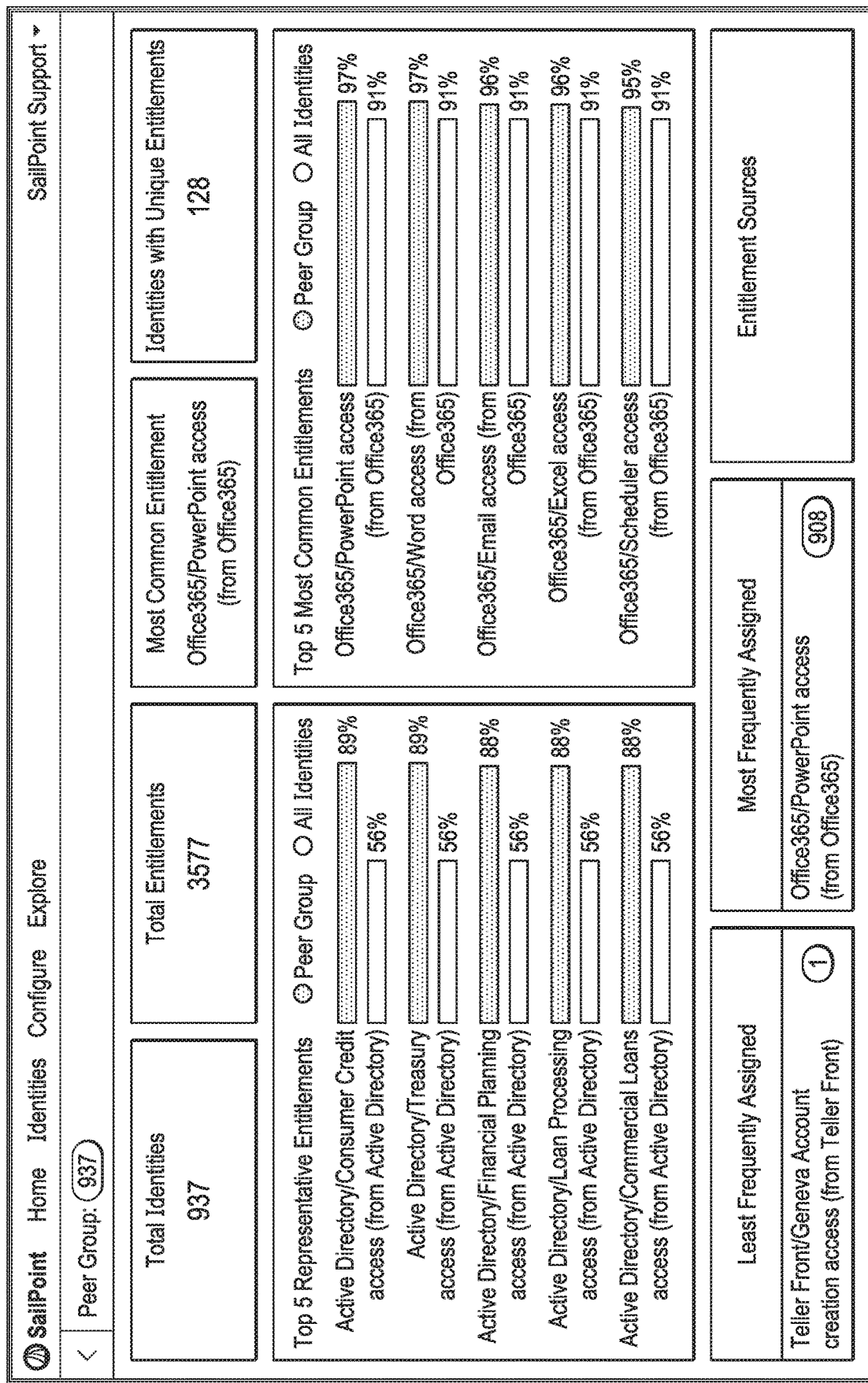

FIG. 6 depicts an embodiment of another interface that may be utilized by an identity management system to visually present data regarding the peer groups determined for identities within an enterprise. In this example, the interface can present data regarding a particular peer group determined for an identity graph, showing, for example, the number of identities within that peer group, what the entitlements are within that peer group, what identities share those entitlements, or why those identities have been grouped together. The interface may also present a wide variety of other data regarding that peer group or identities or entitlements within that (or other) peer groups, including for example, how that peer group, identities within that peer group or other entitlements relate to each other or other determined peer groups, identities or entitlements of the enterprise. Thus, a user viewing such an interface may be able to ascertain reasons why the identities have been grouped and explore for outliers and see entitlements that these identities have in common with each other, as well as how different they are from the rest of the identities and entitlements of an enterprise. Moreover, the user may also "drill down" for more details to discover which identities included and the entitlements assigned.

Figure 7:
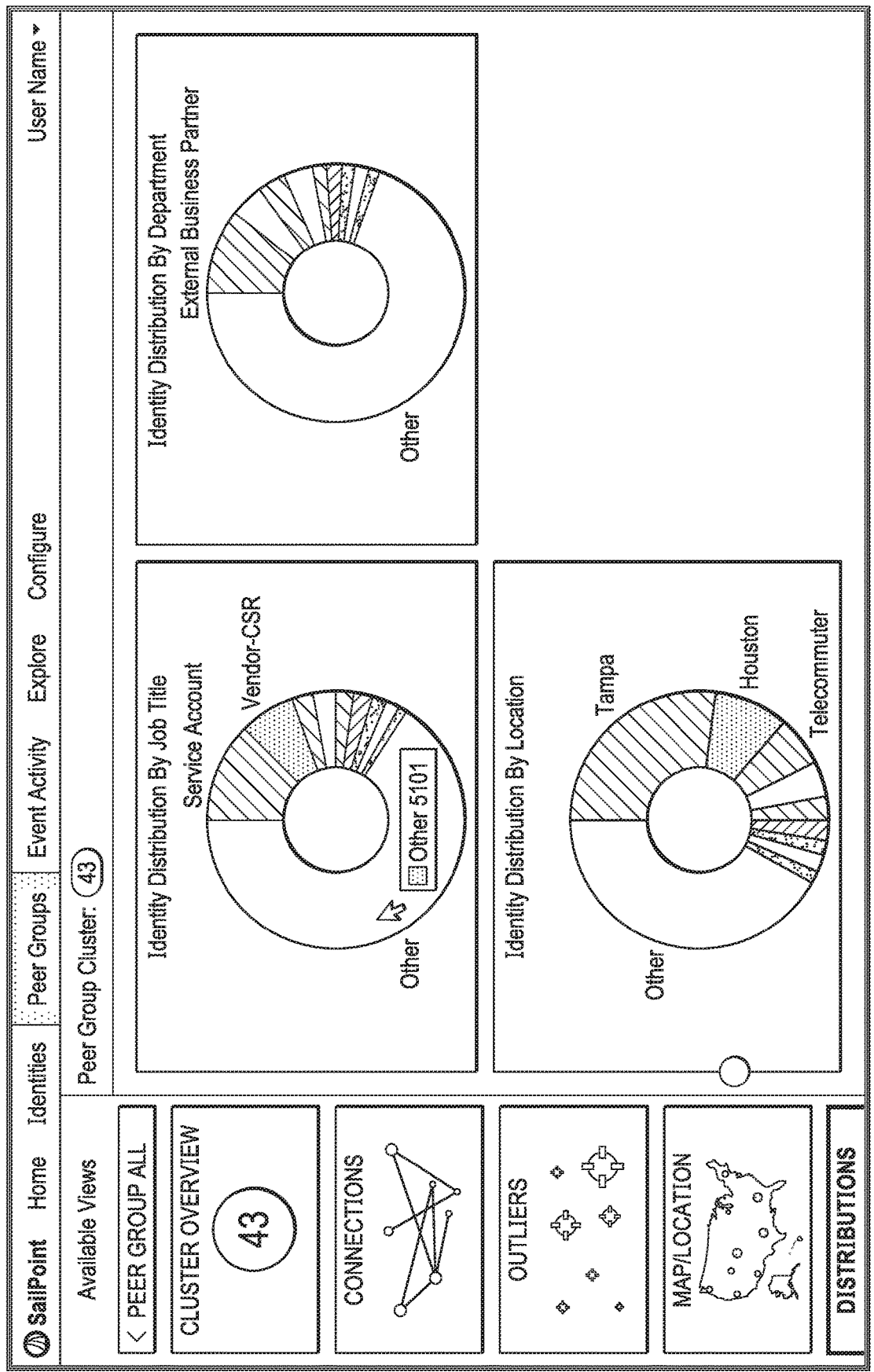

FIG. 7 depicts an embodiment of still another interface that may be utilized by an identity management system to visually present data regarding the peer groups determined for identities within an enterprise. In this example, the interface can present data regarding a particular peer group (e.g., peer group 43) determined for an identity graph, showing, for example, distributions of identities within the peer group, such as the identities of the peer group's correlation with departments, location or job title.

It will now be recalled from the discussions above, that what is desired in the context of identity governance solutions as discussed herein, are identity management solutions that allow for bottom-up role mining. While frequent pattern mining may be utilized to accomplish such role mining, such pattern mining may be combinatorial in nature and may not scale in a manner that allows for any sort of efficient implementation of role mining in real-time or other contexts where a large number of identities and entitlements may be involved.

The use of an identity graph for such role mining may, however, allow role mining that is scalable and efficient, where the role mining can be based on the nature of these identity graphs as disclosed, whereby popular or dominant entitlement patterns may be manifested as peer groups, densely connected components, cliques or pseudo cliques of identity nodes due to the dominant entitlement pattern which identity nodes within such a group may have as a result of the nature of the identity graph. Likewise, within an entitlement subgraph, a dominant or popular entitlement patter may be manifested as a peer-group, densely connected component, clique, or pseudo-clique of entitlement nodes due to the fact that the pattern of entitlements may be shared by a sizeable set of identities as a result of the nature of the identity graph. Accordingly, the nature of an identity graph may allow the flexibility to pursue role mining on either subgraph, the identities subgraph or the entitlement subgraph (or both, or some combination, of these graphs).

Embodiments of identity management systems as disclosed may thus provide role mining based on an identity graph determined by the identity management system as discussed above. In particular, embodiments as disclosed may utilize the peer grouping of an identity graph (or peer grouping of portions or subgraphs thereof) to identify roles from peer groups or the like (e.g., peer groups or other densely connected components or dusters such as cliques or pseudo-cliques).

According to embodiments, therefore, an identity graph may be constructed. A portion of the identity graph may then be determined, where this portion may include the entire identity graph, the entire entitlement subgraph, the entire identities subgraph, a portion of the entitlement subgraph or a portion of the identities subgraph. Peer groups of identities or entitlements of the portion of the identity graph can then be determined. From these peer groups a set of roles may be determined. Specifically, a set of entitlements may be determined from a peer group (e.g., of identities or entitlements), where the determined set of entitlements may represent a determined role. These roles (e.g., an identifier for the determined role and associated entitlements) may then be stored by the identity management system for presentation to a user or other uses.

In one embodiment, the entire entitlement subgraph of the identity graph may be peer grouped substantially as discussed above, and each peer group of entitlements used as a determined role. In other words, according to these types of embodiments, the set of entitlements for each determined peer group of entitlements may represent a determined role. In certain other embodiments, these peer groups of entitlements may themselves be separated into densely connected components, cliques, or pseudo-cliques (if any exist) and the set of entitlements extracted from each of these densely connected components, cliques, or pseudo-cliques used to define the determined roles.

While the peer groups of entitlements may be utilized to perform role determination in some embodiments, it may also be observed that in many cases it is highly likely that peer groups of identities may themselves be associated with a role. This likelihood arises at because the peer grouping of identities may be based on the similarity (as represented by the edges of the identity graph) between those identities, where the similarity is, in turn, based on the number of shared entitlements. Accordingly, in certain embodiments, a set of entitlements may be extracted from each peer group of identities as determined for an identity graph (or identities subgraph), and the set of entitlements extracted from each of these identity peer groups used to define the determined roles.

To extract the set of entitlements from an identity peer group, an entitlement extraction threshold may be utilized such that an entitlement will be extracted from the identity peer group if this entitlement extraction threshold is exceeded with respect to that entitlement. This entitlement extraction threshold may be based on, for example, a threshold number, ratio or percentage of identities of the identity peer group that have that entitlement. By utilizing the identity peer groups to extract the set of entitlements for the determination of roles, in certain embodiments, the creation of the entitlement subgraph or the peer grouping of the entitlement subgraph may be avoided, substantially improving the performance of identity management systems by reducing the time, memory or processor cycles required to perform such role mining.

It will be noted here that some enterprises may have on the order of millions or more of entitlements or identities. Thus, the construction of the identity or entitlement graphs and the peer grouping of the complete set of identities or entitlements may prove prohibitive, especially in the context of real-time implementations of identity management systems and interfaces. Accordingly, other embodiments may further improve the computing performance of identity management systems by scoping the identities or entitlements to confine the graph construction, peer grouping or role determination used to determine the roles. Specifically, in one embodiment, a scoping attribute may be obtained or otherwise determined. This attribute may, for example, be provided by a user and relate to an attribute of an identity such as a title, location, department, peer group of an identity, or other data that may be obtained or associated with an identity (e.g., in association with the identity in identity management data obtained from an identity management system or in an identity graph).

Accordingly, in embodiments where an identity graph has been constructed, an identity graph may exist (e.g., have been created at a previous point) and the scoping attribute may be used to determine a subgraph of the existing identity graph to prune or to peer group in order that roles may then be determined from this subgraph. Here, a scoped identities subgraph or scoped entitlement subgraph of the identity or entitlement graphs, respectively, may be determined from the identity graph based on the scoping attribute. Specifically, in one embodiment a scoped entitlement subgraph associated with a scoping attribute may be determined from an identity graph by querying the identity graph based on the identity attribute to find the entitlement nodes and edges associated with the scoping attribute. Such querying may involve, for example, querying the identity graph to determine the identity nodes of the graph associated with the scoping attribute and determining the entitlement nodes and edges along any path of the identity graph originating with each of those scoped identity nodes. Similarly, a scoped identity subgraph associated with a scoping attribute may be determined from an identity graph by querying the identity graph based on the identity attribute to find the scoped identity nodes and edges associated with the scoping attribute. Such querying may involve, for example, querying the identity graph to determine the identity nodes of the graph associated with the scoping attribute and determining the identity nodes and edges along any path of the identity graph originating with each of those scoped identity nodes.

The pruning and peer grouping of the identities subgraph of the scoped identity subgraph or the entitlements of the scoped entitlement subgraph can then be accomplished substantially as discussed to determine peer-groups of the scoped identities or peer groups of the scoped entitlements. The peer groups of identities or entitlements can then be used for role mining. For example, a set of entitlements may be extracted from each peer group of identities as determined for the scoped identities subgraph of the identity graph, and the set of entitlements extracted from each of these identity peer groups used to define the determined roles. Similarly, the scoped entitlement subgraph of the identity graph may be peer grouped substantially as discussed above, and each peer group of entitlements used as a determined role.

In certain embodiments, such as when no identity graph has been previously constructed, the scoping attribute may be used in the construction of an identity graph. In these types of embodiments, the identity management data of obtained from the identity management (e.g., a most recent snapshot of the identity management data) may be searched based on the scoping attribute to determine the identities of the identity management data associated with that scoping attribute (e.g., identities having that title, location, department, etc.) and the entitlements associated with those determined identities. Once this scoped set of identities and entitlements is determined, an identity graph may be generated from the scoped set of identities and entitlements substantially as discussed above, where a node of the graph is created for each scoped identity and entitlement, and weighted edges are constructed between every pair of identity nodes that shares at least one entitlement and between every pair of entitlement nodes that shares at least one identity. The pruning and peer grouping of the identities subgraph or the entitlements subgraph of the scoped identity graph can then be accomplished substantially as discussed to determine peer-groups of the scoped identities or peer groups of the scoped entitlements. The peer groups of identities or entitlements can then be used for role mining.

For example, a set of entitlements may be extracted from each peer group of identities as determined for the identities subgraph of the scoped identity graph, and the set of entitlements extracted from each of these identity peer groups used to define the determined roles. Similarly, the entitlement subgraph of the scoped identity graph may be peer grouped substantially as discussed above, and each peer group of entitlements used as a determined role. It will be noticed here, that in instances where it is desired to only utilize a entitlement subgraph or an identity subgraph for role mining, only an identities subgraph or an entitlements subgraph may be created from the scoped set of identities or entitlements, and this subgraph pruned and clustered as described to yield the desired identity peer groups or entitlement peer groups to utilize for such role mining.

Figure 8:
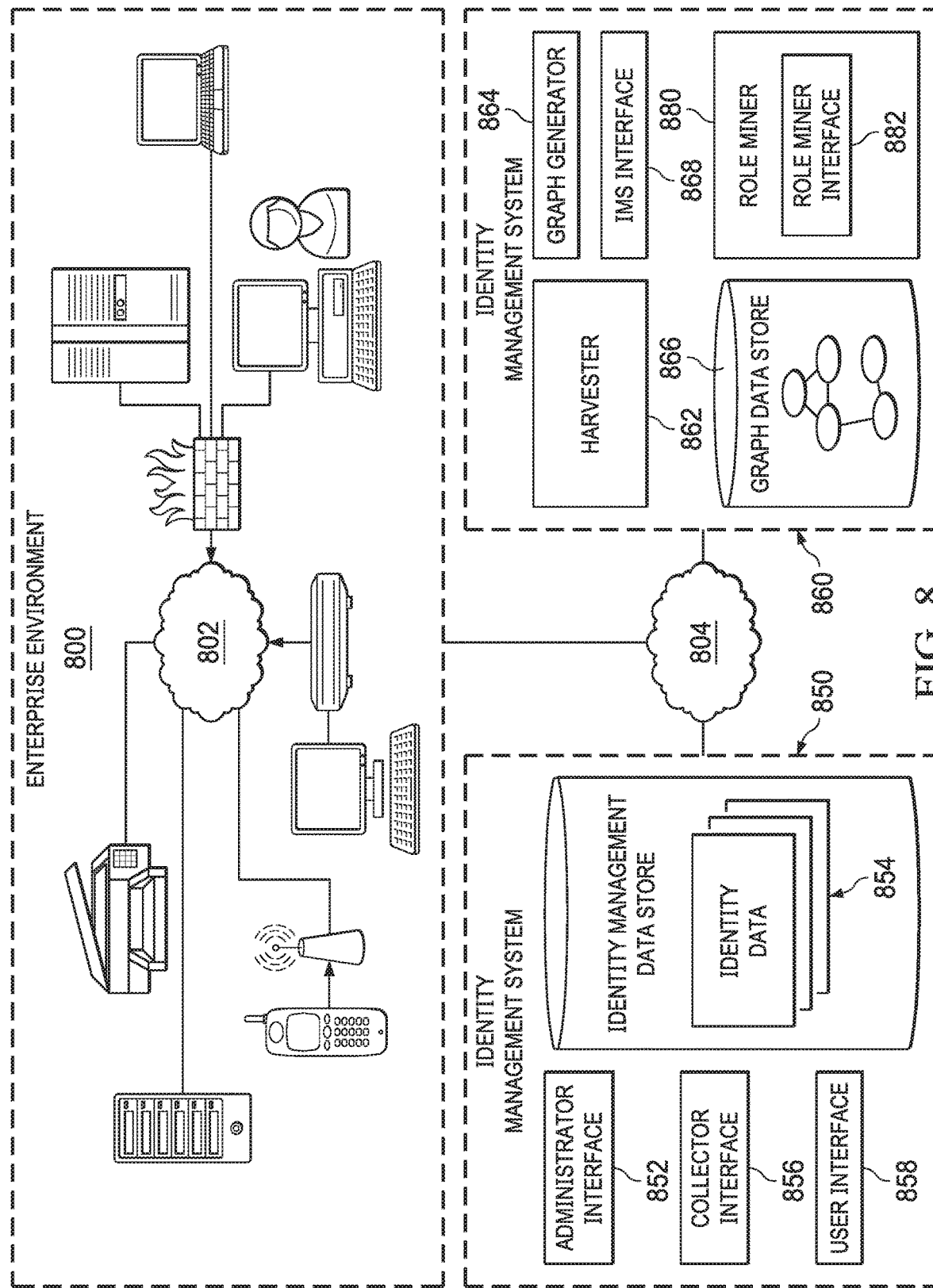
FIG. 8 is a block diagram of a distributed networked computer environment including one embodiment of an identity management system.

Referring to FIG. 8, a distributed networked computer environment including an identity management system with one embodiment of a role miner is depicted. As discussed above, the networked computer environment may include an enterprise computing environment 800 including a number of computing devices or applications that may be coupled over a computer network 802 or combination of computer networks. Enterprise environment 800 may thus include a number of resources, various resource groups and users associated with an enterprise. Users may have various roles, job functions, responsibilities, etc. to perform within various processes or tasks associated with enterprise environment 800.

Users may access resources of the enterprise environment 800 to perform functions associated with their jobs, obtain information about enterprise 800 and its products, services, and resources, enter or manipulate information regarding the same, monitor activity in enterprise 800, order supplies and services for enterprise 800, manage inventory, generate financial analyses and reports, or generally to perform any task, activity or process related to the enterprise 800. Thus, to accomplish their responsibilities, users may have entitlements to access resources of the enterprise environment 800. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 800 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to for other reasons. Access risks can also arise from roles in enterprise environment 800 which may shift, change, evolve, etc. leaving entitlements non optimally distributed among various users.

To assist in managing the entitlements assigned to various users and more generally in managing and assessing access risks in enterprise environment 800, an identity management system 850 may be employed. Such an identity management system 850 may allow an administrative or other type of user to define one or more identities and one or more entitlements and associate these identities with entitlements using, for example, an administrator interface 852. Moreover, an identity management system 850 may allow such a user to define one or more roles for the enterprise, where these defined enterprise roles are defined as collections of access entitlements or access profiles and may be assigned to identities through the identity management system 850 based on specific rules of the enterprise in terms of the identity's attributes, their expected responsibilities within the organization, or other criteria. These enterprise roles as defined by the user through the identity management system 850 may thus define an ideal or 'golden' state of the roles of an enterprise.

Examples of such identity management systems are Sailpoint's IdentityIQ and IdentityNow products. Note here, that while the identity management system 850 has been depicted in the diagram as separate and distinct from the enterprise environment 800 and coupled to enterprise environment 800 over a computer network 804 (which may the same as, or different than, network 802), it will be realized that such an identity management system 850 may be deployed as part of the enterprise environment 800, remotely from the enterprise environment, as a cloud based application or set of services, or in another configuration.

The identity management system 850 may thus store identity management data 854. The identity management data 854 stored may include a set entries, each entry corresponding to and including an identity (e.g., alphanumerical identifiers for identities) as defined and managed by the identity management system, a list or vector of entitlements (e.g., alphanumeric identifiers for entitlements) assigned to that identity by the identity management system, a list or vector of enterprise roles assigned to that identity, and a time stamp at which the identity management data was collected from the identity management system. Other data could also be associated with each identity, including data that may be provided from other systems such as a title, location or department associated with the identity. The set of entries may also include entries corresponding to entitlements and roles, where each entry for a role may include the role identifier (e.g., alphanumerical identifier or name for the role) and a list or vector of the entitlements associated with each role. Other data could also be associated with each role, such as a title, location or department associated with the role.

Accordingly, the collectors 856 of the identity management system 850 may obtain or collect event data from various systems within the enterprise environment 800 and process the event data to associate the event data with the identities defined in the identity management data 854 to evaluate or analyze these events or other data in an identity management context. As part of a robust identity management system, it is desirable to analyze the identity management data 854 associated with an enterprise 800. Accordingly, an identity management system 860 may include a harvester 862 and a graph generator 864. The harvester 862 may obtain identity management data 854 from one or more identity management systems 850 associated with enterprise 800. Graph generator 864 may allow an identity graph or subgraphs thereof to be generated from the obtained identity management data 854 and stored in graph data store 866. Interfaces 868 of the identity management system 860 or interface 858 may use a graph in the graph data store 866 or associated peer groups to present one or more interfaces which may be used for risk assessment, including the presentation of roles mined from such graphs.

Additionally, a user may interact with the identity management system 850 through a user interface 858 to access or manipulate data on identities, entitlements, events, roles or generally perform identity management with respect to enterprise environment 800. As but one example, as the roles, entitlements and identities of an enterprise evolve they may stray in substantial and detrimental ways from an ideal state, or other identity governance desires, of the enterprise. Users of an identity management system may thus wish to determine a current data-driven assessment of the current role structure for their enterprise.

By determining a current snapshot of the roles mined from an actual state of their identity governance structure, the 'golden' enterprise roles as defined by the users of the enterprise may be compared with the mined roles to reduce discrepancies therebetween, including for example, the identification of new roles, the evolution of the enterprise defined roles to match the evaluation of the actual role structure (e.g., the mined roles), or the performance housekeeping on the assignment of entitlements or roles within the enterprise to more particularly tailor the actual role structure to the ideal role structure. Additionally, by viewing the mined roles extraneous, singleton or outlier entitlements that have been deprecated or are in need of certification may be identified.

Accordingly, it is desirable for identity management solutions to offer a role mining capability whereby collections of entitlements may be ascertained from the identity management data associated with enterprise. Embodiments of identity management system 850 may thus provide a role mining tool through the user interface 858. In this manner, a user may be presented with the ability to perform role mining through the user interface 858 (or interface 868), along with an optional attribute or criteria to scope the mining of the roles. One or more interfaces with the results of the role mining can then be determined and presented to the user through the role mining tool of user interface 858.

To provide such a role mining tool, identity management system 860 may include role miner 880. Role miner 880 may include an interface 882. When a request for role mining is received from the user through the user interface 858, a request to perform role mining can be submitted to the role miner 880 from the identity management system 850 (e.g., or user interface 858 or other component of identity management system 850) through the interface 882, where the request may include zero or more scoping attributes that may have been provided by the user through the user interface. The request may include other criteria or attributes, such as a pruning threshold to utilize when creating an identity graph or subgraph or a role size which may be used to determine which graphs or subgraphs to utilize when performing role extraction. Note here, that while the identity management system 850 has been depicted in the diagram as separate and distinct from the identity management system 860 and coupled to identity management system 860 over a computer network 804, it will be realized that such an identity management system 850 and identity management system 860 may be deployed as part of the same identity management system or different identity management system, as a cloud based application or set of services, or in another configuration entirely.

As such, when a request for role mining and the zero or more associate scoping (or other) attributes are received through the role minter interface 882, the role miner 880 may preform role mining as discussed. In particular, in one embodiment, the role miner may determine if there is an identity graph in graph data store 866, or if the identity graph currently in graph data store 866 was created within some previous time window (e.g., last hour, last twenty four hours, last week, etc.). If there is an identity graph available (e.g., if one exists in the graph data store 866 or was created within the time window), the role miner 880 can determine if a scoring attribute was received with the role mining request. If no scoring attribute was received, the available identity graph may be used for role mining. If, however, a scoring attribute was received and an identity graph is available, the existing identity graph can be scoped based on the received scoring attribute and the type of role mining to be performed. As discussed, the role miner 880 may perform role mining based on an identities subgraph, an entitlement subgraph, or some combination according to various embodiments. The type of role mining to be performed may, for example, be configured by an administrator of the identity management system 860 or may be specified by a user in a request for role mining using the role mining interface 858.

Accordingly, in embodiments where an identity graph has been constructed, an identity graph may exist (e.g., have been created at a previous point) in the graph data store 866 and the scoping attribute may be used to determine a subgraph of the existing identity graph to use as a role mining graph. Peer groups may be determined from that role mining graph in order that roles may be then be determined from this subgraph. Here, a scoped identities subgraph or scoped entitlement subgraph of the identity graph may be determined from the identity graph based on the scoping attribute and the type of role mining to be performed.

Specifically, in one embodiment a scoped entitlement subgraph associated with a scoping attribute may be determined from an identity graph by querying the identity graph in the graph data store 866 based on the scoping attribute to find the entitlement nodes and edges associated with the scoping attribute. Such querying may involve, for example, querying the identity graph to determine the identity nodes of the graph associated with the scoping attribute and determining the entitlement nodes and edges along any path of the identity graph originating with each of those scoped identity nodes.

Similarly, a scoped identity subgraph associated with a scoping attribute may be determined from an identity graph in the graph data store 866 by querying the identity graph based on the identity attribute to find the scoped identity nodes and edges associated with the scoping attribute. Such querying may involve, for example, querying the identity graph to determine the identity nodes of the graph associated with the scoping attribute and determining the identity nodes and edges along any path of the identity graph originating with each of those scoped identity nodes.

Once a graph to utilize for role mining is determined (e.g., the entire available identity graph, the scoped identities subgraph, the scoped entitlement subgraph or some combination), the peer groups of this role mining graph may be determined. In some cases, in instances where an identity graph is available the identity graph may also have been previously pruned and peer grouped. Thus, the peer groups associated with the role mining graph to use for role mining may be determined by accessing the peer groups previously determined for the identity graph that are associated with the nodes of the role mining graph. For example, if identity peer groups are to be utilized for role mining, the identity peer groups associated with the identity nodes of the role mining graph may be determined from the previously determined entitlement peer groups for the identity graph. Likewise, if entitlement peer groups are to be utilized for role mining, the entitlement peer groups associated with the entitlement nodes of the role mining graph may be determined from the previously determined entitlement peer groups for the identity graph.

If however, peer groups have not been determined for the available identity graph, the role mining graph (e.g., the entire available identity graph, the scoped identities subgraph, the scoped entitlement subgraph or some combination) may be peer grouped as discussed above based on the type of role mining to be performed. For example, the pruning and peer grouping of a role mining graph comprising a scoped identities subgraph or a scoped entitlement subgraph can be accomplished substantially as discussed to determine identity peer-groups of the scoped identities or entitlement peer groups of the scoped entitlements.

These peer groups of identities or entitlements can then be used by the role miner for role mining. For example, a set of entitlements may be extracted from each peer group of identities determined for a role mining graph (e.g., a scoped identities subgraph of the identity graph), and the set of entitlements extracted from each of these identity peer groups used to define the determined roles. To extract the set of entitlements from an identity peer group, an entitlement extraction threshold may be utilized such that an entitlement will be extracted from the identity peer group if this entitlement extraction threshold is exceeded with respect to that entitlement. This entitlement extraction threshold may be based on, for example, a threshold number, ratio or percentage of identities of the identity peer group that have that entitlement. Similarly, in cases where the role mining graph is a scoped entitlement subgraph of the identity graph, the entitlements of the role mining graph may be peer grouped substantially as discussed above, and each peer group of entitlements used as a determined role.

In instances where the role miner 880 receives a request for role mining and zero or more associated scoping attributes and there is no identity graph currently in graph data store 866 (or the graph in the graph data store 866 was created outside of some previous time window), a role mining graph may be determined from the identity management data 854 and the type of role mining to be performed.

In particular, according to certain embodiments the role miner 880 can determine if a scoping attribute was received with the received request. If there is no scoping attribute, identity management data 854 may be obtained and an identity graph (or identities subgraph or entitlements subgraph) constructed as previously discussed. The type of graph constructed for use as a role mining graph may be dependent on the type of role mining to be performed as discussed.

However, if a scoping attribute was received, the identity management data 854 obtained from the identity management system 850 (e.g., a most recent snapshot of the identity management data) may be scoped based on the attribute by searching the identity management data 854 based on the scoping attribute to determine the identities of the identity management data 854 associated with that scoping attribute (e.g., identities having that title, location, department, etc.) and the entitlements associated with those determined identities determined.

Once this scoped set of identities and entitlements is determined, a role mining graph (e.g., an identity graph, identities subgraph or entitlements subgraph) may be generated from the scoped set of identities and entitlements substantially as discussed above, where a node of the graph is created for each scoped identity and entitlement, and weighted edges are constructed between every pair of identity nodes that shares at least one entitlement and between every pair of entitlement nodes that shares at least one identity.

The pruning and peer grouping of the role mining graph constructed from the scoped identity management data (e.g., the identity graph, entitlement subgraph, identities subgraph) can then be accomplished substantially as discussed to determine peer-groups of the scoped identities or peer groups of the scoped entitlements. The determined peer groups of identities or entitlements can then be used for role mining depending on the type of role mining to be accomplished. If a pruning threshold has been provided by a user this pruning threshold may be utilized in the pruning the role mining graph. Additionally, if a role size has been provided this may be utilized during role mining such that role will only be extracted from subgraphs of the role mining graph that have a number of nodes exceeding the role size.

Once the role miner 880 has determined the set of entitlements comprising each of the mined roles, these mined roles may be presented to the user through interface 858 of the identity management system 850. These roles may, for example, be assigned an identifier by the role miner 880 (e.g., an assigned alphanumerical identifier or a semantic identifier that may be determined, for example, from identities or entitlements associated with the role). The roles may then be presented graphically in an interface 858 with which the user may interact to determine additional or different data about the presented roles.

Figure 9:
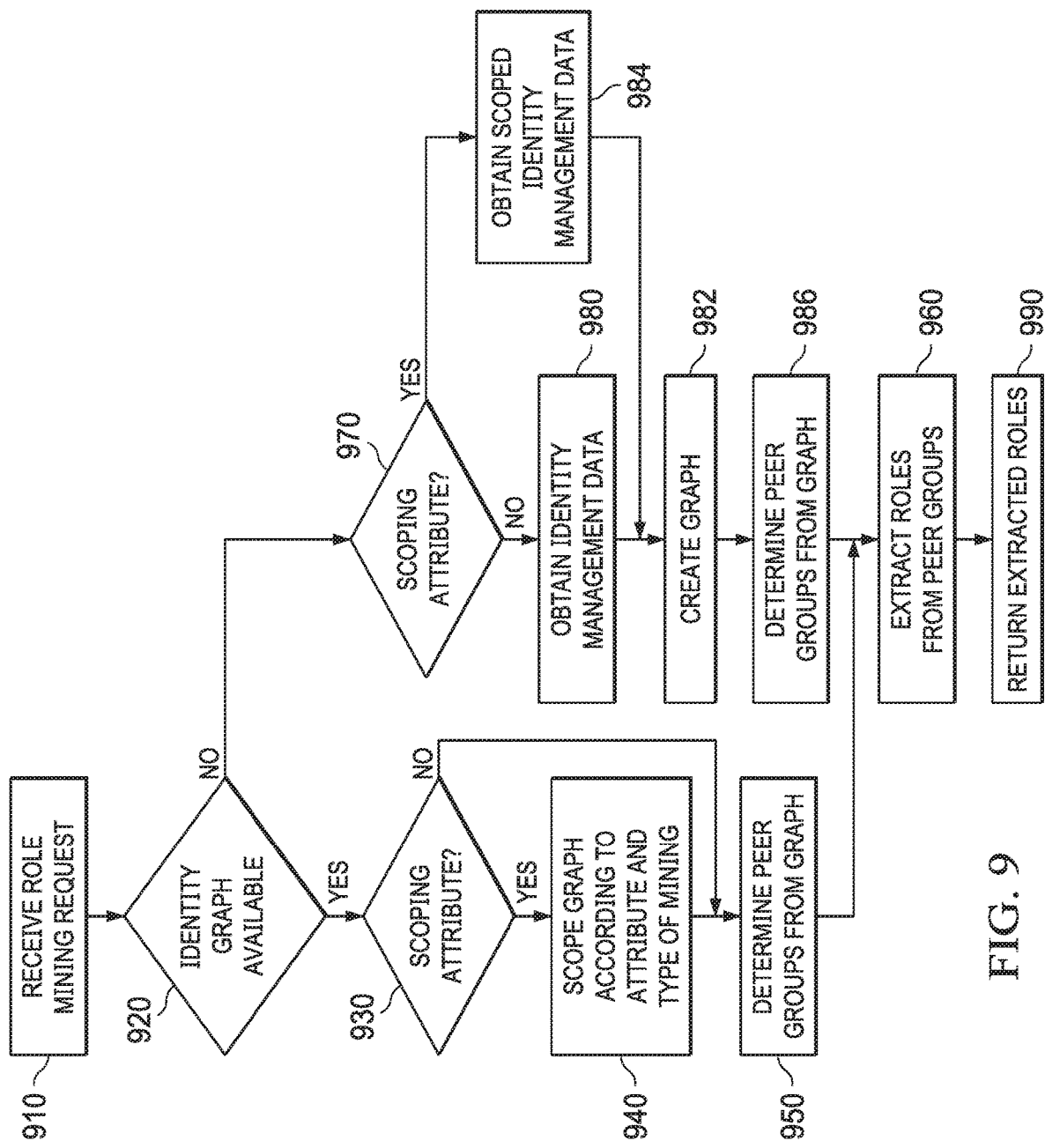
FIG. 9 is a flow diagram of one embodiment of a method for role mining.

FIG. 9 depicts one embodiment of a method for role mining that may be used in embodiments of an identity management system such as those disclosed herein. Initially, at step 910 a request to perform role mining can be received, where the request may include zero or more scoping attributes (e.g., that may have been provided by the user or otherwise determined). At step 920 it can be determined if an identity graph is available. This determination may involve determining if an identity graph has been previously created or is a previously create identity graph was created within some previous time window (e.g., last hour, last twenty four hours, last week, etc.).

If there is an identity graph available (Yes branch of step 920), it can then be determined at step 930 determine if a scoping attribute was received with the role mining request. If no scoring attribute was received (No branch of step 930), the available identity graph may be used for role mining. If, however, a scoring attribute was received and an identity graph is available (Yes branch of step 930), the existing identity graph can be scoped at step 940 based on the received scoring attribute and the type of role mining to be performed. As discussed, the role mining may be performed based on an identities subgraph, an entitlement subgraph, or some combination according to various embodiments.

Accordingly, in embodiments where an identity graph has been constructed, an identity graph may exist (e.g., have been created at a previous point) and the scoping attribute may be used to determine a subgraph of the existing identity graph to use as a role mining graph. Peer groups may be determined from that role mining graph in order that roles may be then be determined from this subgraph. Here, at step 940, a scoped identities subgraph or scoped entitlement subgraph of the identity graph may be determined from the identity graph based on the scoping attribute and the type of role mining to be performed.

Specifically, in one embodiment a scoped entitlement subgraph associated with a scoping attribute may be determined from an identity graph by querying a previously created identity graph based on the scoping attribute to find the entitlement nodes and edges associated with the scoping attribute. Similarly, a scoped identity subgraph associated with a scoping attribute may be determined from a previously created identity graph by querying the identity graph based on the identity attribute to find the scoped identity nodes and edges associated with the scoping attribute.

Once a graph to utilize for role mining at is determined at step 940, the peer groups of this role mining graph may be determined at step 950. In many cases, in instances where an identity graph is available the identity graph may also have been previously pruned and peer grouped. Thus, the peer groups associated with the role mining graph to use for role mining may be determined by accessing the peer groups previously determined for the identity graph that are associated with the nodes of the role mining graph. If however, peer groups have not been determined for the available identity graph, the role mining graph (e.g., the entire available identity graph, the scoped identities subgraph, the scoped entitlement subgraph or some combination) may be peer grouped as discussed above based on the type of role mining to be performed. For example, the pruning and peer grouping of a role mining graph comprising a scoped identities subgraph or a scoped entitlement subgraph can be accomplished substantially as discussed to determine identity peer-groups of the scoped identities or entitlement peer groups of the scoped entitlements.

These peer groups of identities or entitlements can then be used by for role mining at step 960 by extracting the roles from these peer groups. For example, a set of entitlements may be extracted from each peer group of identities determined for a role mining graph and the set of entitlements extracted from each of these identity peer groups used to define the determined roles. Similarly, in cases where the role mining graph is a scoped entitlement subgraph of the identity graph, the entitlements of the role mining graph may be peer grouped substantially as discussed above, and each peer group of entitlements used as a determined role.

Returning to step 920, in instances where a request for role mining and zero or more associated scoping attributes is received and there is no available identity graph (No branch of step 920) a role mining graph may be determined from the identity management data and the type of role mining to be performed.

In particular, at step 970 it can be determined if a scoping attribute was received with the received request. If there is no scoping attribute (NO branch of step 970), identity management data may be obtained at step 980 and a role mining graph (e.g., identity graph, identities subgraph or entitlements subgraph) constructed as previously discussed at step 982. The type of graph constructed for use as a role mining graph may be dependent on the type of role mining to be performed.

However, if a scoping attribute was received (Yes branch of step 970), scoped identity management data may be obtained at step 984 based on the attribute by searching the identity management data based on the scoping attribute to determine the identities of the identity management data associated with that scoping attribute (e.g., identities having that title, location, department, etc.) and the entitlements associated with those determined identities determined.

Once this scoped set of identities and entitlements is determined, a role mining graph (e.g., an identity graph, identities subgraph or entitlements subgraph) may be generated from the scoped set of identities and entitlements at step 982, whereby a node of the graph is created for each scoped identity and entitlement, and weighted edges are constructed between every pair of identity nodes that shares at least one entitlement and between every pair of entitlement nodes that shares at least one identity.

The pruning and peer grouping of the role mining graph constructed from the obtained identity management data (e.g., the identity graph, entitlement subgraph, identities subgraph) can then be accomplished at step 986 substantially as discussed to determine peer-groups of the identities or peer groups of the entitlements of the determined role mining graph. The determined peer groups of identities or entitlements can then be used for role mining depending on the type of role mining to be accomplished at step 960.

Once the roles have been determined (e.g., the set of entitlements comprising each of the mined roles), these mined roles may be presented to the user through interface of the identity management system at step 990. These roles may, for example, be assigned an identifier and presented graphically in an interface with which the user may interact to determine additional or different data about the presented roles.

Figure 10:
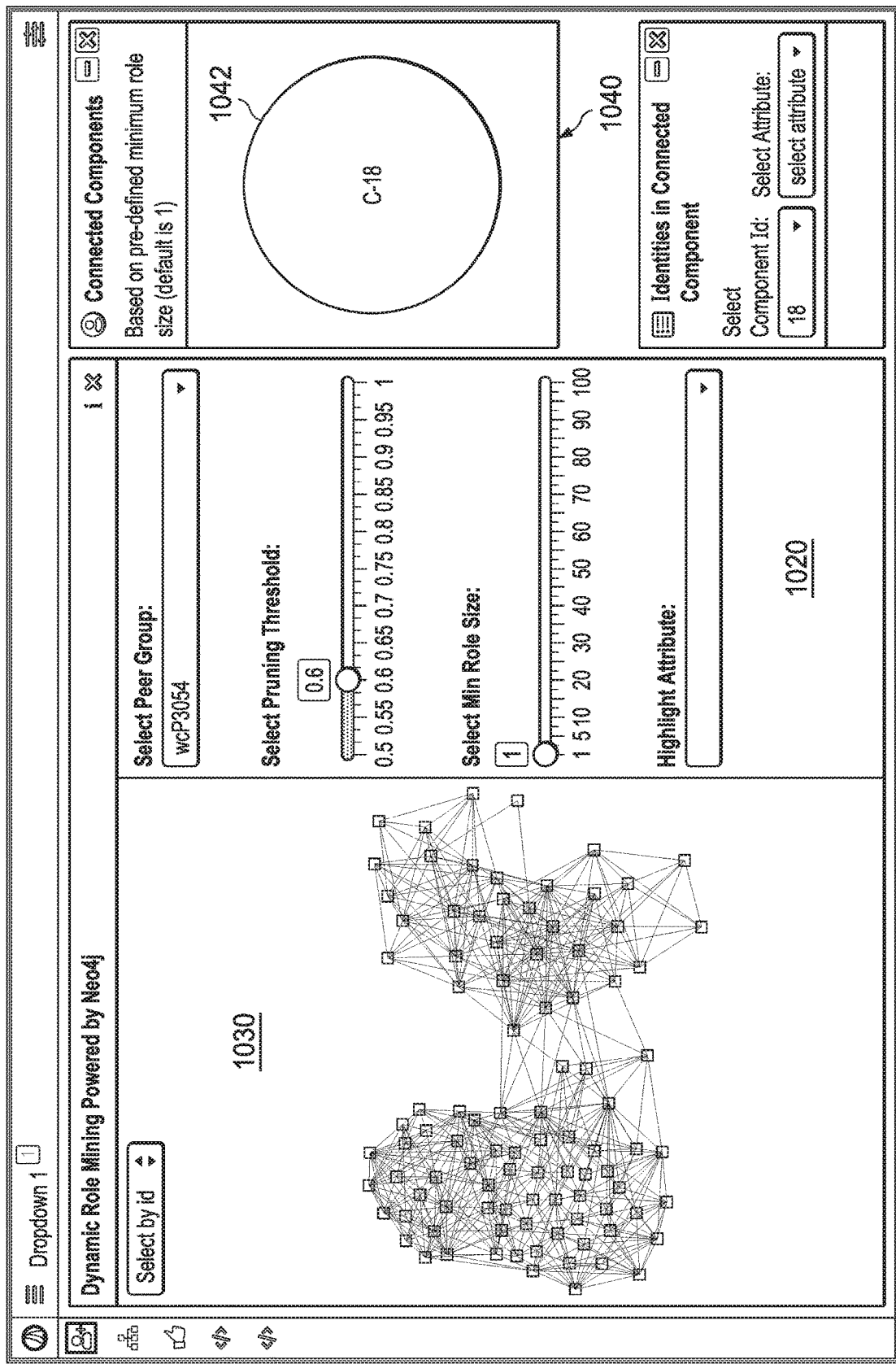
FIGS. 10-14 depict interfaces that may be utilized by embodiments of an identity management system.
Figure 11:
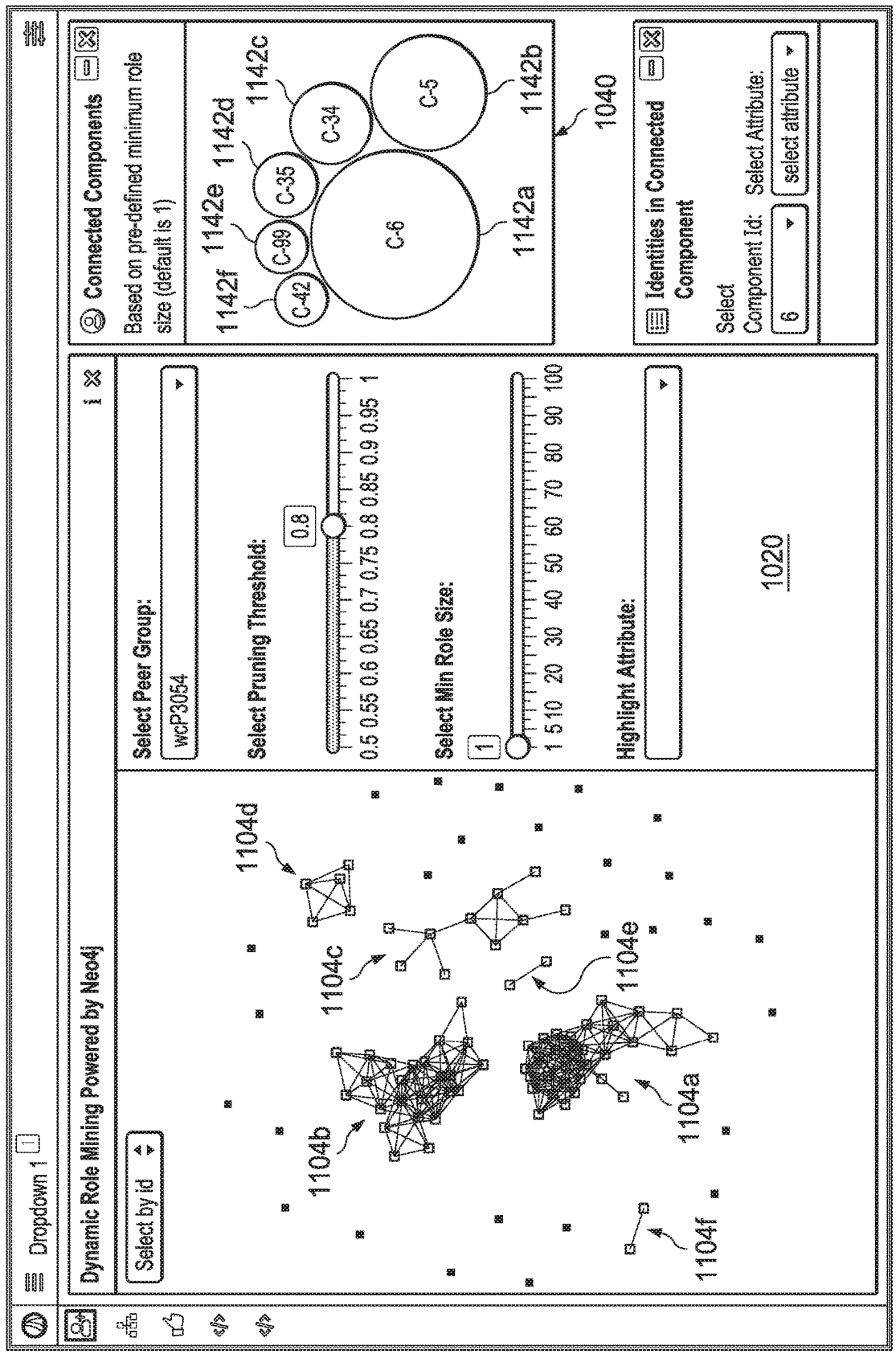
Figure 12:
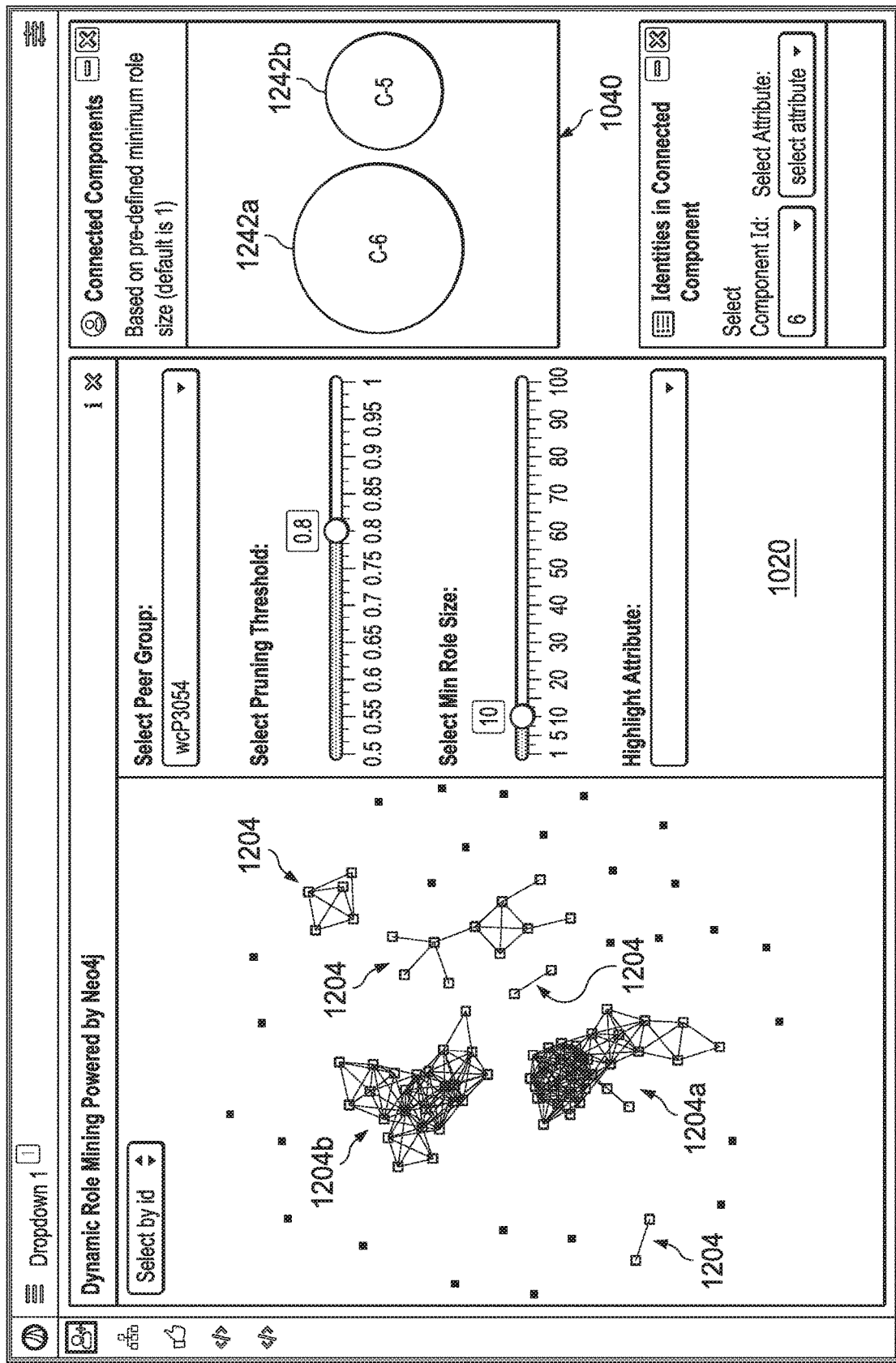

FIGS. 10-12 depict embodiments of these types of interfaces that may be utilized by embodiments of an identity management system as disclosed herein. Looking first at FIG. 10, one embodiment of an interface for an identity management system that may be utilized in association with role mining is depicted. Here, the interface 1010 may include an area 1020 that allows specification of a scoping attribute or other criteria associated with role mining. In the depicted example, the area 1020 may allow a user selection of an identity peer group, a pruning threshold to be used and a minimum role size. A graph display area 1030 may display the graphs or subgraphs of identity nodes and similarity relationships resulting from application of the attributes selected by the user in area 1020.

Specifically, in one embodiment, when a user selects a particular peer group in area 1020 the identity graph or identity management data maintained by the identity management system may be scoped based on the peer group selected by the user. An identities graph may be created by the identity management system using the identities of the selected peer group and edges between the identity nodes based on shared entitlements as described. The edges of this identities graph can then be pruned according to the user selected pruning threshold in area 1020 and the pruned graph displayed in graph display area 1030.

Area 1040 can display a view of roles (here referred to as components) mined from the graph created and displayed in graph display area 1030. In one embodiment, once the identities graph is created, the identity management system may perform role mining on the identities graph as discussed above. In particular, according to one embodiment, the identity management system will determine each distinct subgraph of the determined identities graph, and for those subgraphs, determine which, if any, of those subgraphs includes a number of nodes greater than the minimum role size defined by the user in area 1020. The roles can then be mined from any of these determined subgraphs.

Area 1040 will then display an indicator for each of the subgraphs of the graph displayed in graph 1030 from which a role was mined. In one embodiment, the role may be assigned an identifier and an icon (e.g., circle) representing the role may be displayed along with the identifier for the role in area 1040. The size of the icon may, for example, be reflective of the number of nodes or size of the subgraph from which the associated role was mined.

In this example, a user has selected a peer group "wcP3054"and defined a pruning threshold of"0.6" and a minimum role size of 1 in area 1020. Thus, an identities graph may be generated by the identity management system using the identities associated with the peer group "wcP3054" using a pruning threshold of 0.6 for the edges. This identities graph is displayed in graph display area 1030. Moreover, here there is only subgraph of the identities graph and it has a greater number of identity nodes than the minimum role size of 1 specified by the user. Thus, the identities management system may perform role mining on this identities graph, assign the identifier "C-18" to the mined role and display an icon 1042 in area labeled with the role identifier ("C-18") with a size reflective of the number of nodes of the identity graph represented in graph display area 1030 from which the role was mined.

Moving to FIG. 11, here, the user has selected the same peer group "wcP3054"and defined a pruning threshold of"0.8" and a minimum role size of 1 in area 1020. Thus, an identities graph may be generated by the identity management system using the identities associated with the peer group "wcP3054" using a pruning threshold of 0.8 for the edges. This identities graph is displayed in graph display area 1030. Here, however, as the edges have been pruned according to a higher pruning threshold (e.g., 0.8) there are 6 subgraphs 1104 of the identities graph that have a greater number of identity nodes than the minimum role size of 1 specified by the user. Thus, the identities management system may perform role mining on each of these subgraphs 1104, assign identities to each of the mined roles and display an associated icon 1142 with the assigned label in area 1040, where the icon 1142 may have a size reflective of the number of nodes in the associated subgraph. Here, for example, icon 1142a may be associated with subgraph 1104a, icon 1142b associated with subgraph 1104b, icon 1142c associated with subgraph 1104c, etc.

Continuing with the same example, in FIG. 12 the user has selected the same peer group "wcP3054" and defined a pruning threshold of "0.8." However, here the user has defined a minimum role size of 10 in area 1020. Thus, an identities graph may be generated by the identity management system using the identities associated with the peer group "wcP3054" using a pruning threshold of 0.8 for the edges. This identities graph is displayed in graph display area 1030. Here, as in FIG. 11, there are 6 subgraphs 1204. However, as the user has defined a minimum role size of 10 in the example depicted in FIG. 12, the identities management system may only perform role mining on each of these subgraphs 1204a, 1204b that have more than 10 identity nodes. The identity management system can then assign identities to each of the mined roles and display an associated icon 1242 with the assigned label in area 1040, where the icon 1242 may have a size reflective of the number of nodes in the associated subgraph. Here, for example, icon 1242b may be associated with subgraph 1204a and icon 1242b associated with subgraph 1204b.

Figure 13:
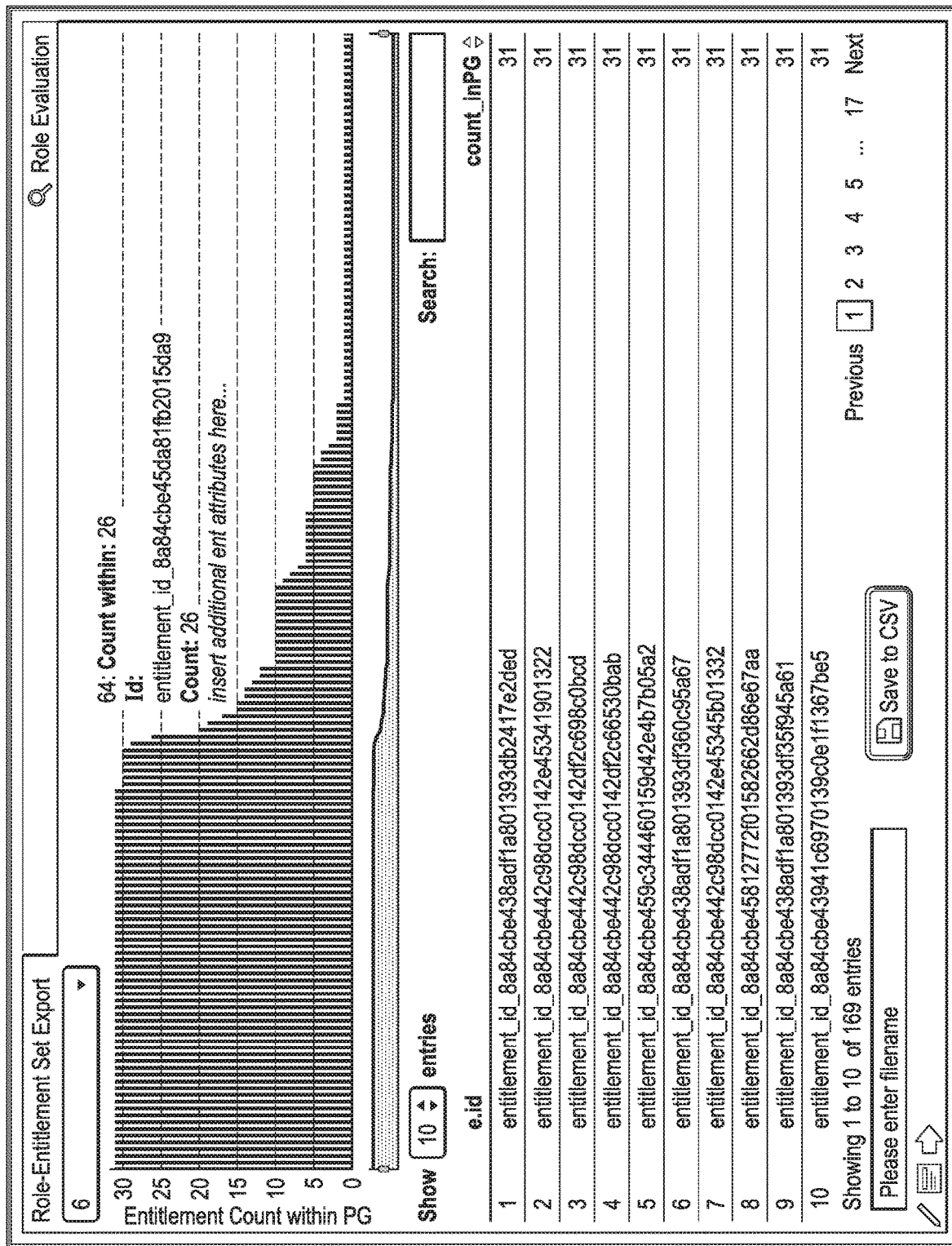

FIG. 13 depicts an embodiment of an interface that may be utilized by an identity management system to display a distribution of entitlements within a particular role. Specifically, in the depicted embodiment, when a user selects a particular role (e.g., within an interface presented by the identity management system), the user may be presented with an interface such as that in FIG. 13 whereby a list of entitlements of the role and the distribution of those entitlements may be presented to a user in both a textual manner and through a visual depiction, such as a histogram or the like.

Figure 14:
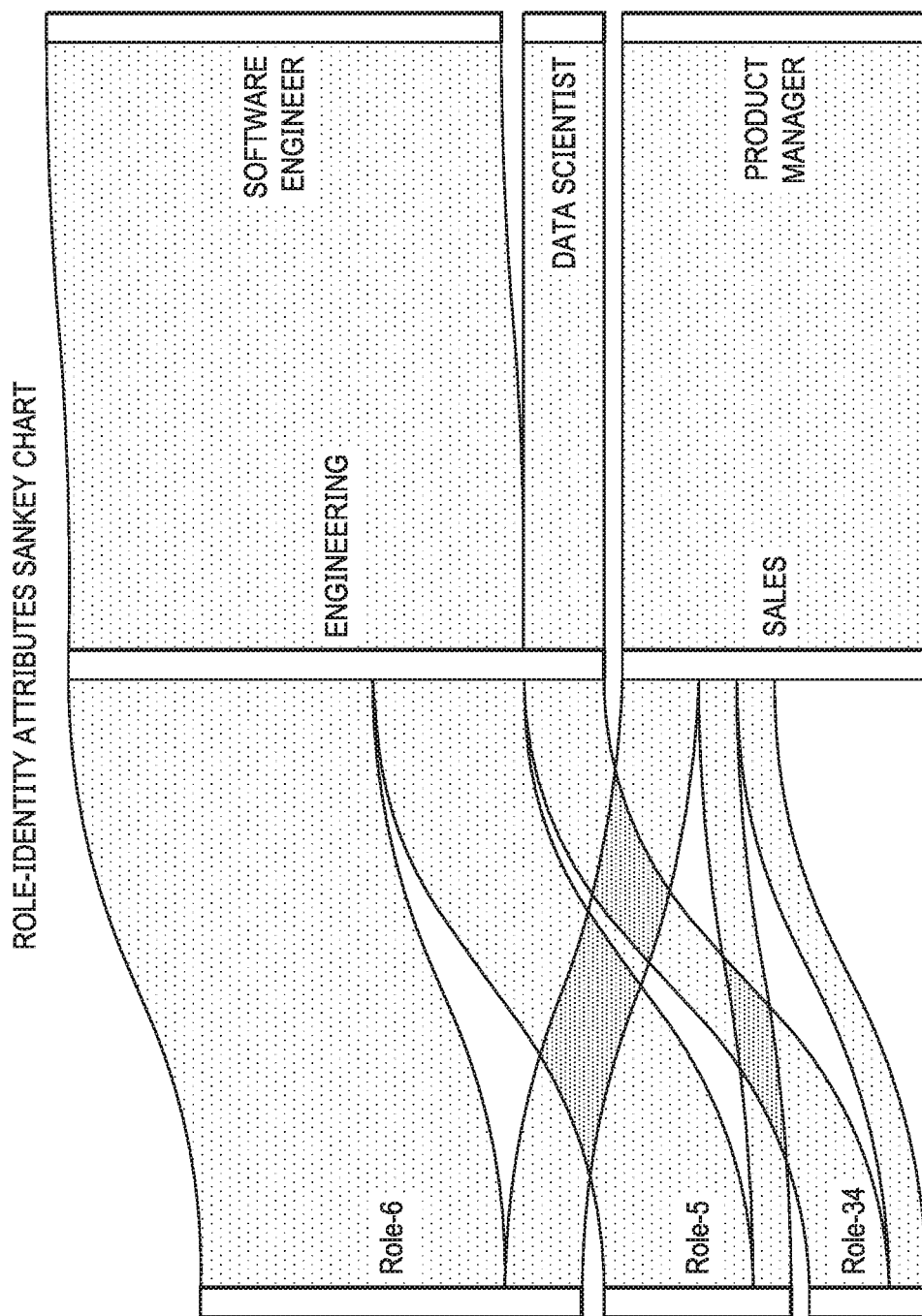

FIG. 14 depicts another embodiment of an interface that may be utilized by an identity management system to display data regarding determined roles. Here, the interface may be a Sankey chart showing which roles (e.g., Role 6, Role 5 and Role 34) include certain attributes (E.g., Engineering, Sales, Software Engineer, Data Scientist and Product Manager).

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system using an identity graph for risk detection, comprising:

a data store;

a hardware processor;

a non-transitory, computer-readable storage medium, including computer instructions executable by the hardware processor for:

obtaining identity management data from one or more identity management systems in a distributed enterprise computing environment, the identity management data comprising data on a set of identities and a set of entitlements associated with the set of identities utilized in identity management in the distributed enterprise computing environment;

evaluating the obtained identity management data to determine the set of identities and the set of entitlements associated with the set of identities, wherein the set of identities and the associated set of entitlements are utilized in identity management of the distributed enterprise computing environment;

generating a first identity graph from the identity management data by:

creating a node of the first identity graph for each of the determined set of identities, for each first identity and second identity, from the determined set of identities, that share at least one entitlement of the set of entitlements, creating an edge of the first identity graph between a first node and a second node representing respectively the first identity and the second identity of the first identity graph, and generating a weight for each of the created edges of the first identity graph based on the at least one shared entitlement between the first identity and the second identity;

storing the first identity graph in the data store;

pruning a set of edges of the first identity graph based on the set of weights of the set of edges to generate a second identity graph;

storing the second identity graph in the data store;

clustering the set of identities or set of entitlements represented by the second identity graph into a set of peer groups based on the second identity graph, including the nodes of the second identity graph representing the set of identities and the edges of the second identity graph and the associated weights;

determining a role from an identity peer group of the set of identity peer groups or an entitlement peer group of the set of entitlement peer groups, where the role comprises a set of entitlements determined from the identity peer group or the entitlement peer group; and storing the role in the data store, including an identification of the determined set of entitlements comprised by the role.

2. The system of claim 1, wherein the weight generated for each edge of the first identity graph between each first node and second node is a similarity weight.

3. The system of claim 2, wherein the similarity weight is an approximate weight based on the at least one entitlement shared between the first identity represented by the first node and the second identity represented by the second node.

4. The system of claim 2, wherein the similarity weight is an actual weight calculated based on a number of the set of entitlements shared between the first identity represented by the first node and the second identity represented by the second node.

5. The system of claim 1, wherein the instructions are further for determining a subgraph of the second identity graph based on a scoping attribute, wherein the identity peer group or the entitlement peer group is associated with the determined subgraph.

6. The system of claim 5, wherein the role or the subgraph is presented through a user interface.

7. The system of claim 5, wherein the subgraph is determined based on a search of the second identity graph using the scoping attribute.

8. A method of using an identity graph for risk detection, comprising:
   obtaining identity management data from one or more identity management systems in a distributed enterprise computing environment, the identity management data comprising data on a set of identities and a set of entitlements associated with the set of identities utilized in identity management in the distributed enterprise computing environment;
   evaluating the obtained identity management data to determine the set of identities and the set of entitlements associated with the set of identities, wherein the set of identities and the associated set of entitlements are utilized in identity management of the distributed enterprise computing environment;
   generating a first identity graph from the identity management data by:
      creating a node of the first identity graph for each of the determined set of identities,
      for each first identity and second identity, from the determined set of identities that share at least one entitlement of the set of entitlements, creating an edge of the first identity graph between a first node and second node representing respectively the first identity and the second identity of the first identity graph, and
      generating a weight for each of the created edges of the first identity graph based on the at least one shared entitlement between the first identity and the second identity;
   storing the first identity graph in the data store;
   pruning a set of edges of the first identity graph based on the set of weights of the set of edges to generate a second identity graph;
   storing the second identity graph in the data store;
   clustering the set of identities or set of entitlements represented by the second identity graph into a set of peer groups based on the second identity graph, including the nodes of the second identity graph representing the set of identities and the edges of the second identity graph and the associated weights;
   determining a role from an identity peer group of the set of identity peer groups or an entitlement peer group of the set of entitlement peer groups, where the role comprises a set of entitlements determined from the identity peer group or the entitlement peer group; and
   storing the role in the data store, including an identification of the determined set of entitlements comprised by the role.

9. The method of claim 8, wherein the weight generated for each edge of the first identity graph between each first node and second node is a similarity weight.

10. The method of claim 9, wherein the similarity weight is an approximate weight based on the at least one entitlement shared between the first identity represented by the first node and the second identity represented by the second node.

11. The method of claim 9, wherein the similarity weight is an actual weight calculated based on a number of the set of entitlements shared between the first identity represented by the first node and the second identity represented by the second node.

12. The method of claim 8, wherein the instructions are further for determining a subgraph of the second identity graph based on a scoping attribute, wherein the identity peer group or the entitlement peer group is associated with the determined subgraph.

13. The method of claim 12, wherein the role or the subgraph is presented through a user interface.

14. The method of claim 12, wherein the subgraph is determined based on a search of the second identity graph using the scoping attribute.

15. A non-transitory computer readable storage medium, comprising instructions executable by the hardware processor for using an identity graph for risk detection by:
   obtaining identity management data from one or more identity management systems in a distributed enterprise computing environment, the identity management data comprising data on a set of identities and a set of entitlements associated with the set of identities utilized in identity management in the distributed enterprise computing environment;
   evaluating the obtained identity management data to determine the set of identities and the set of entitlements associated with the set of identities, wherein the set of identities and the associated set of entitlements are utilized in identity management of the distributed enterprise computing environment;
   generating a first identity graph from the identity management data by:
      creating a node of the first identity graph for each of the determined set of identities,
      for each first identity and second identity, from the determined set of identities, that share at least one entitlement of the set of entitlements, creating an edge of the first identity graph between a first node and a second node representing respectively the first identity and the second identity of the first identity graph, and
      generating a weight for each of the created edges of the first identity graph based on the at least one shared entitlement between the first identity and the second identity;
   storing the first identity graph in the data store;
   pruning a set of edges of the first identity graph based on the set of similarity weights of the set of edges to generate a second identity graph;
   storing the second identity graph in the data store;
   clustering the set of identities or set of entitlements represented by the second identity graph into a set of peer groups based on the second identity graph, including the nodes of the second identity graph representing the set of identities and the edges of the second identity graph and the associated weights;
   determining a role from an identity peer group of the set of identity peer groups or an entitlement peer group of the set of entitlement peer groups, where the role comprises a set of entitlements determined from the identity peer group or the entitlement peer group; and storing the role in the data store, including an identification of the determined set of entitlements comprised by the role.

16. The non-transitory computer readable medium of claim 15, wherein the weight generated for each edge of the first identity graph between each first node and second node is a similarity weight.

17. The non-transitory computer readable medium of claim 16, wherein the similarity weight is an approximate weight based on the at least one entitlement shared between the first identity represented by the first node and the second identity represented by the second node.

18. The non-transitory computer readable medium of claim 16, wherein the similarity weight is an actual weight calculated based on a number of the set of entitlements shared between the first identity represented by the first node and the second identity represented by the second node.

19. The non-transitory computer readable medium of claim 15, wherein the instructions are further for determining a subgraph of the second identity graph based on a scoping attribute, wherein the identity peer group or the entitlement peer group is associated with the determined subgraph.

20. The non-transitory computer readable medium of claim 19, wherein the role or the subgraph is presented through a user interface.

21. The non-transitory computer readable medium of claim 19, wherein the subgraph is determined based on a search of the second identity graph using the scoping attribute.

* * * * *